US012382208B2

(12) United States Patent
Yamamoto

(10) Patent No.: US 12,382,208 B2
(45) Date of Patent: Aug. 5, 2025

(54) ACOUSTIC APPARATUS AND ACOUSTIC CONTROL METHOD

(71) Applicant: PANASONIC INTELLECTUAL PROPERTY MANAGEMENT CO., LTD., Osaka (JP)

(72) Inventor: Masami Yamamoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 414 days.

(21) Appl. No.: 18/003,473

(22) PCT Filed: Sep. 27, 2021

(86) PCT No.: PCT/JP2021/035432
§ 371 (c)(1),
(2) Date: Dec. 27, 2022

(87) PCT Pub. No.: WO2022/224467
PCT Pub. Date: Oct. 27, 2022

(65) Prior Publication Data
US 2023/0254626 A1    Aug. 10, 2023

(30) Foreign Application Priority Data

Apr. 23, 2021  (JP) .................. 2021-073639

(51) Int. Cl.
H04R 1/10       (2006.01)
G10L 25/78      (2013.01)
H04R 29/00      (2006.01)

(52) U.S. Cl.
CPC ........... H04R 1/1041 (2013.01); G10L 25/78 (2013.01); H04R 1/1016 (2013.01);
(Continued)

(58) Field of Classification Search
CPC ....... G10K 11/17825; G10K 11/17827; G10K 11/17833; G10K 11/17881;
(Continued)

(56) References Cited

U.S. PATENT DOCUMENTS 11,675,437 B2 *   6/2023   Rüdiger ................. G06F 3/015
                                                345/156
11,922,949 B1 *   3/2024   Joshi ..................... G06F 3/167
(Continued)

FOREIGN PATENT DOCUMENTS

JP      2002112383 A    4/2002
JP      2013051624 A    3/2013
(Continued)

OTHER PUBLICATIONS

International Search Report, mailed Dec. 14, 2021, for International Patent Application No. PCT/JP2021/035432. (5 pages) (with English Translation).
(Continued)

Primary Examiner — Lun-See Lao
(74) Attorney, Agent, or Firm — Seed IP Law Group LLP

(57) ABSTRACT

An acoustic device includes a detection unit configured to detect a timing to transition to each of a first power-saving mode and a second power-saving mode, a battery, a monitoring unit configured to monitor a remaining capacity of the battery, a signal processing unit configured to process a sound signal, a sound emitting unit configured to acoustically output the processed sound signal, a communication unit configured to transmit and receive a signal to and from a communication terminal and transmit the processed sound signal to the communication terminal, and a control unit configured to stop an operation of the signal processing unit based on the detection of the timing to transition to the first power-saving mode.

10 Claims, 11 Drawing Sheets

(52) U.S. Cl.
CPC ......... *H04R 1/1025* (2013.01); *H04R 1/1075* (2013.01); *H04R 29/001* (2013.01); *H04R 2430/01* (2013.01); *H04R 2460/03* (2013.01)

(58) Field of Classification Search
CPC ..... G10K 11/17885; G10K 2210/1081; G10K 2210/3016; G10L 25/78; H04R 1/1016; H04R 1/1025; H04R 1/1041; H04R 1/1075; H04R 2410/07; H04R 2430/01; H04R 2430/20; H04R 2460/01; H04R 2460/03; H04R 2460/13; H04R 25/305; H04R 29/001; H04R 3/005; H04R 5/033
USPC .......................................... 381/74, 312, 314
See application file for complete search history.

(56) References Cited

U.S. PATENT DOCUMENTS

| | | | |
|---|---|---|---|
| 2002/0039424 | A1 | 4/2002 | Watanuki |
| 2007/0162169 | A1 | 7/2007 | Watanuki |
| 2011/0033073 | A1 | 2/2011 | Inoshita et al. |
| 2011/0261982 | A1 | 10/2011 | Isozaki et al. |
| 2013/0051561 | A1 | 2/2013 | Ozawa et al. |
| 2015/0043762 | A1* | 2/2015 | Kim ..................... H04R 25/405 381/315 |
| 2015/0222979 | A1 | 8/2015 | Ozawa et al. |
| 2016/0183009 | A1* | 6/2016 | Kim ..................... H04R 25/558 381/315 |
| 2017/0164089 | A1* | 6/2017 | Lee ..................... H04R 1/1025 |
| 2019/0141428 | A1 | 5/2019 | Gampe |
| 2019/0200113 | A1* | 6/2019 | Kim ........................ H02J 7/342 |

FOREIGN PATENT DOCUMENTS

| | | |
|---|---|---|
| JP | 2019524017 A | 8/2019 |
| WO | WO 2011045905 A1 | 4/2011 |

OTHER PUBLICATIONS

"Use only one ear to charge one ear! You can also use it like that," Mar. 14, 2018, URL=https://www.goodspress.jp/news/149170, download date Dec. 2, 2021. (14 pages) (with Partial Machine Translation).

Extended European Search Report dated Sep. 19, 2024, for the corresponding European Patent Application No. 21937957.5, 10 pages.

* cited by examiner

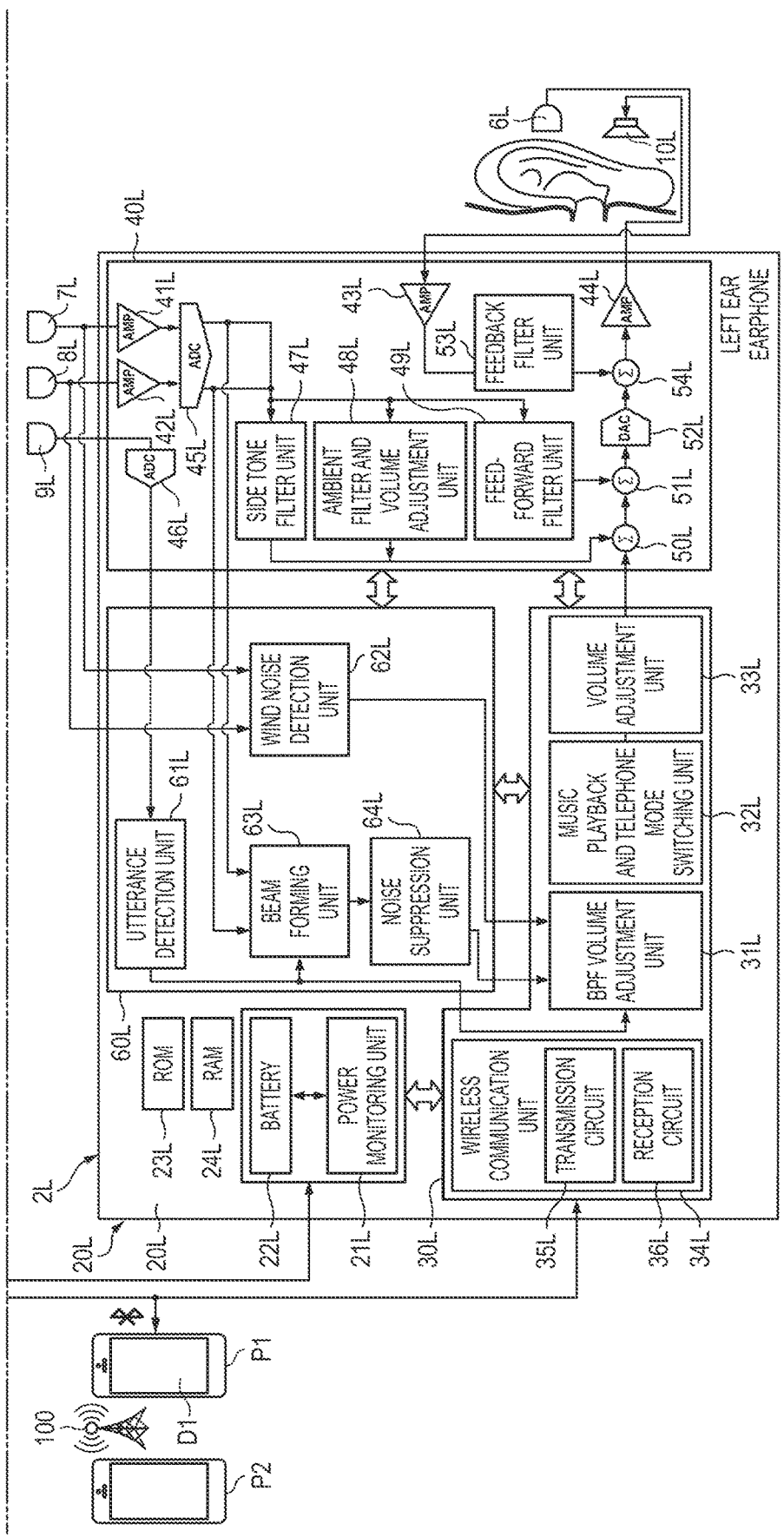
(FIG. 2 CONTINUED)

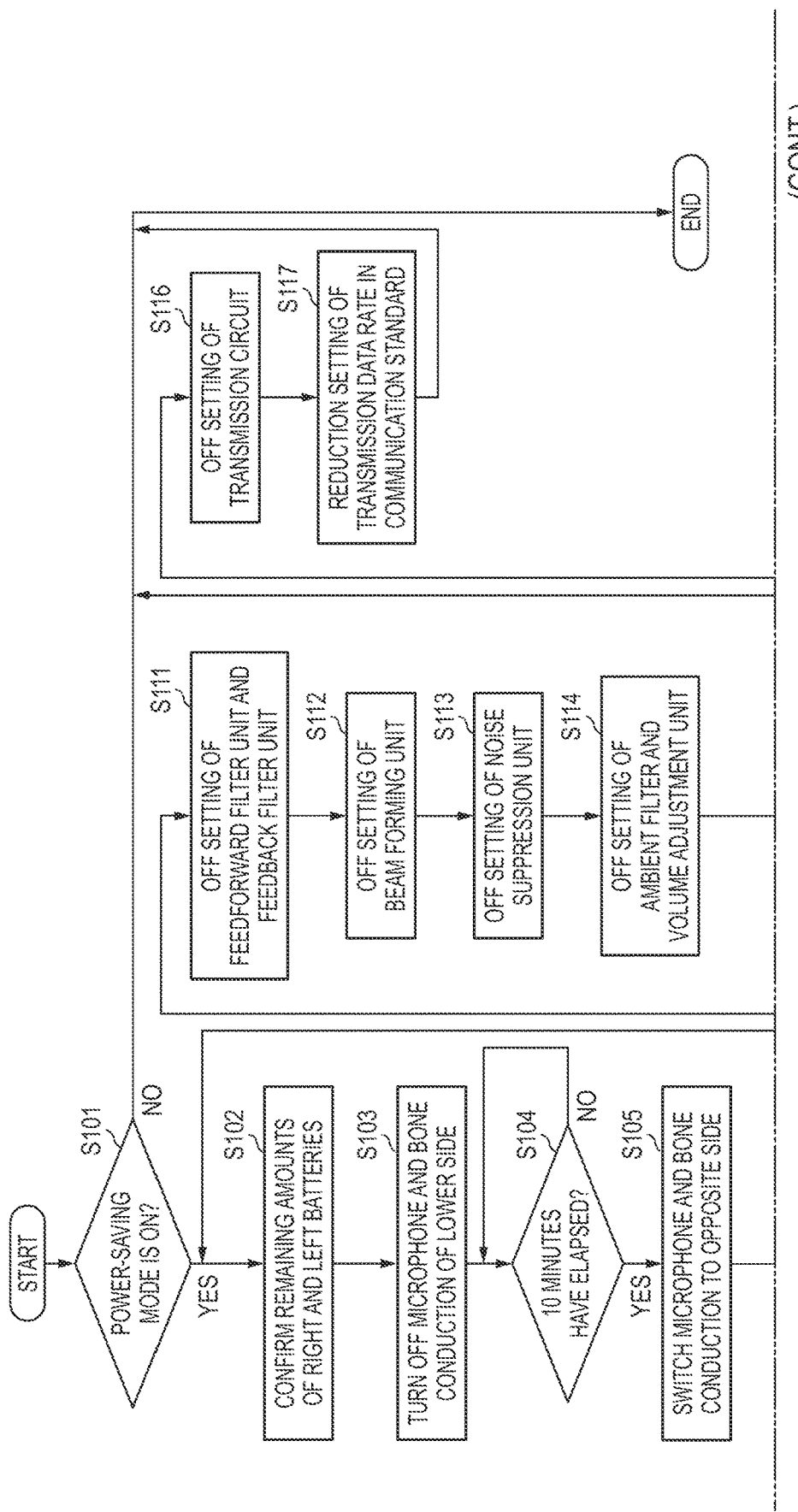

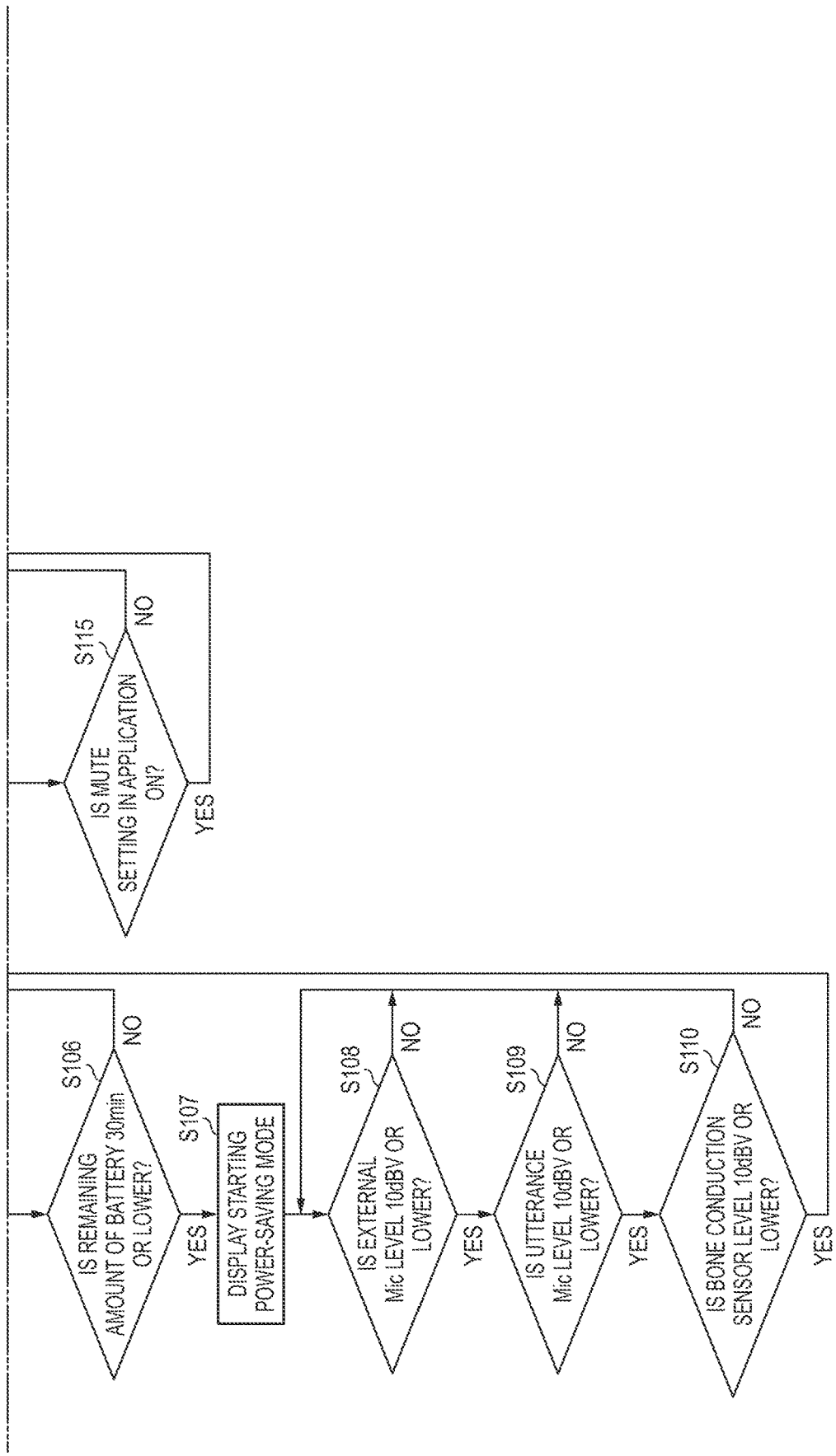

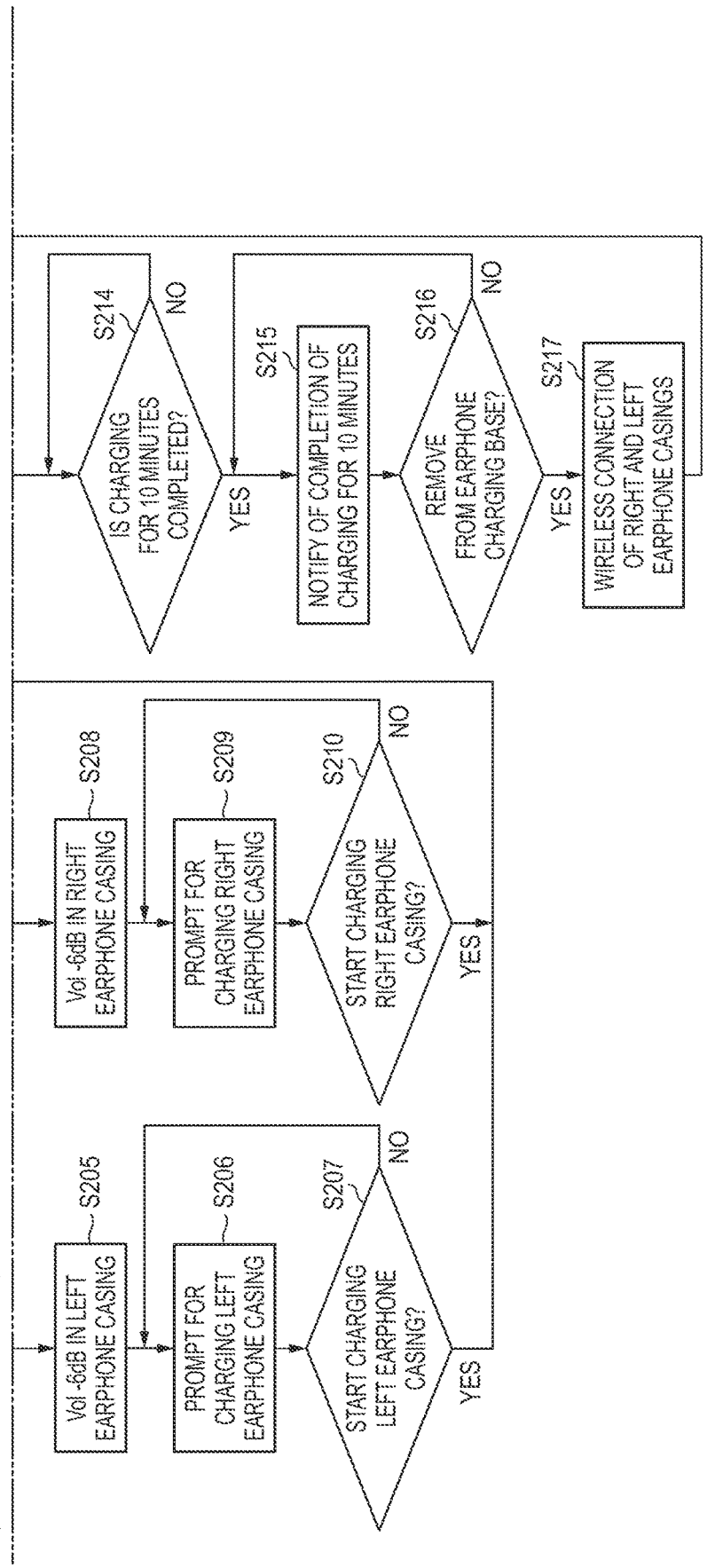

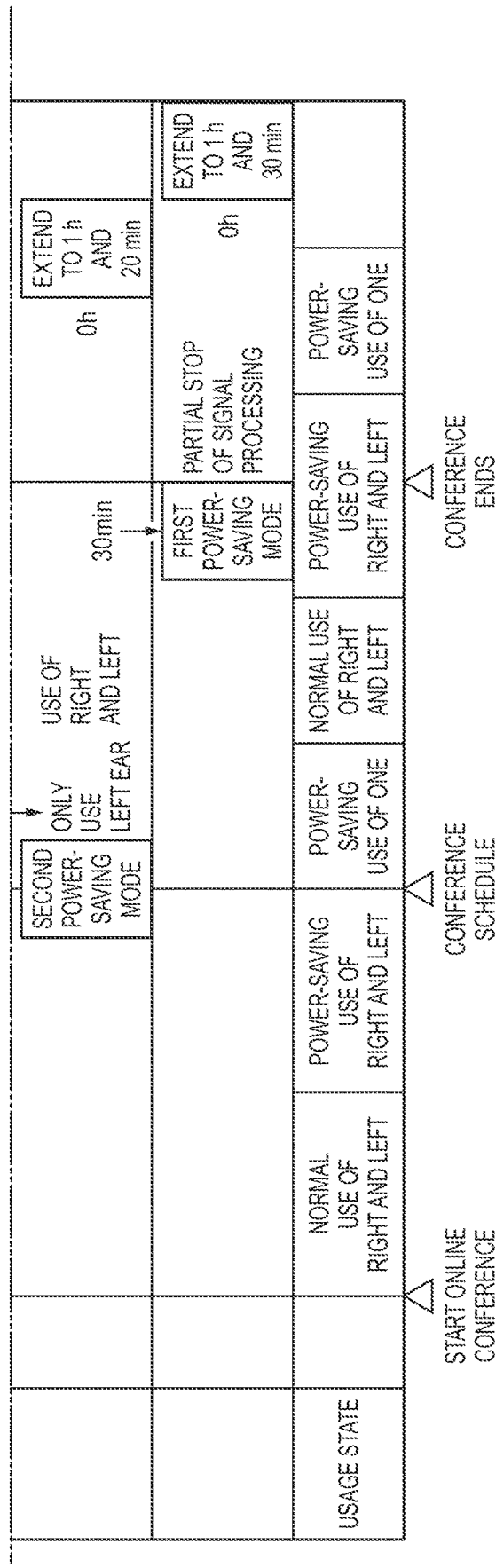

ACOUSTIC APPARATUS AND ACOUSTIC CONTROL METHOD

TECHNICAL FIELD

The present disclosure relates to an acoustic apparatus and an acoustic control method.

BACKGROUND ART

Patent Literature 1 discloses a configuration in which when a battery of one of hearing aids worn in right and left has dead, the other is notified that the battery has died.

CITATION LIST

Patent Literature

Patent Literature 1: WO 2011/045905

SUMMARY OF INVENTION

However, in the configuration of Patent Literature 1, it is not expected that the right and left hearing aids determine dead batteries thereof in advance. In the first place, the hearing aid is provided with a calling reception function, but it is not expected in advance that the hearing aid is provided with a calling sending function that can be used regularly or irregularly. Therefore, for example, when trying to apply the configuration in Patent Literature 1 to use in a conference where a user who is a wearer is expected to speak by himself/herself, since the calling sending function is not provided, the hearing aid becomes unusable if the determination on the dead battery is not performed in advance, and not only is it difficult to perform efficient power-saving control, but convenience to the user may be reduced.

By the way, in recent years, with a spread of smartphones, a use of small wireless earphones is becoming mainstream. Right and left earphones of this type are configured independently, and each of the right and left earphones includes a built-in battery and is appropriately charged and used. Recently, due to an increasing number of teleworkers in a business scene, the number of cases where a remote online conference is held using this type of earphone is increasing due to convenience thereof, and a demand for preventing a dead battery during the conference increases.

The present disclosure has been devised in view of the above-described circumstances of the related art, and an object of the present disclosure is to provide an acoustic control method and an acoustic apparatus that can improve convenience to a user by performing adaptive and efficient power-saving control according to a user condition in an event such as a conference where utterance and calling reception scenes are expected.

The present disclosure provides an acoustic apparatus including two acoustic devices respectively worn in a left ear and a right ear of a user. Each of the acoustic devices includes a detection unit configured to detect a timing to transition to each of a first power-saving mode and a second power-saving mode; a battery; a monitoring unit configured to monitor a remaining capacity of the battery; a signal processing unit configured to process an input sound signal; a sound emitting unit configured to acoustically output the processed sound signal; a communication unit connected to a communication terminal owned by the user to allow signal transmission and reception, and configured to transmit the processed sound signal to the communication terminal; and a control unit configured to stop an operation of the signal processing unit based on the detection of the timing to transition to the first power-saving mode. The control unit is configured to notify of prompting the user to charge the acoustic device, which has a smaller remaining capacity of the battery, for a predetermined time based on the detection of the timing to transition to the second power-saving mode, and make only the other acoustic device, which has a larger remaining capacity of the battery, continued to be used.

The present disclosure provides an acoustic control method for controlling two acoustic devices each including a battery and respectively worn in a left ear and a right ear of a user. The acoustic control method includes: for each of the acoustic devices, a detection step of detecting a timing to transition to each of a first power-saving mode and a second power-saving mode; a monitoring step of monitoring a remaining capacity of the battery; a signal processing step of processing an input sound signal; a sound emitting step of acoustically outputting the processed sound signal; a communication step of being connected to a communication terminal owned by the user to allow signal transmission and reception, and transmitting the processed sound signal to the communication terminal; and a control step of stopping an operation in the signal processing step based on the detection of the timing to transition to the first power-saving mode. In the control step, the user is notified of being prompted to charge the acoustic device, which has a smaller remaining capacity of the battery, for a predetermined time based on the detection of the timing to transition to the second power-saving mode, and only the other acoustic device, which has a larger remaining capacity of the battery, is continued to be used.

According to the present disclosure, convenience to a user can be improved by performing adaptive and efficient power-saving control according to a user condition in an event such as a conference where utterance and calling reception scenes are expected.

BRIEF DESCRIPTION OF DRAWINGS

FIG. 3 is a flowchart illustrating a processing flow in a first power-saving mode performed by the circuit board illustrated in FIG. 2.

DESCRIPTION OF EMBODIMENTS

Hereinafter, embodiments specifically disclosing an acoustic apparatus and an acoustic control method according to the present disclosure will be described in detail with reference to the drawings as appropriate. However, an unnecessarily detailed description may be omitted. For example, a detailed description of a well-known matter or a repeated description of substantially the same configuration may be omitted. This is to avoid unnecessary redundancy in the following description and to facilitate understanding of those skilled in the art. In addition, each of the accompanying drawings is referred to in accordance with a direction of a reference sign. It should be noted that the accompanying drawings and the following description are provided for a thorough understanding of the present disclosure by those skilled in the art, and are not intended to limit subject matters recited in the claims.

A complete wireless earphone which includes a pair of right and left earphone casings 2R and 2L and in which the earphone casings 2R and 2L are wirelessly connected to each other is described as an example of the present disclosure, but the present disclosure is not limited thereto. The contents of the present disclosure can be appropriately applied as long as independently provided batteries 22R and 22L are built in the earphone casings 2R and 2L, respectively.

In addition, a "unit" or an "apparatus" in the embodiment is not limited to a physical configuration simply mechanically implemented by hardware, and includes a configuration in which a function of the configuration is implemented by software such as a program. Further, a function of one configuration may be implemented by two or more physical configurations, or functions of two or more configurations may be implemented by, for example, one physical configuration.

First Embodiment

A first embodiment according to the present disclosure will be described based on FIGS. 1 to 7.

Regarding Hardware Configuration of Earphone Apparatus

Figure 1:
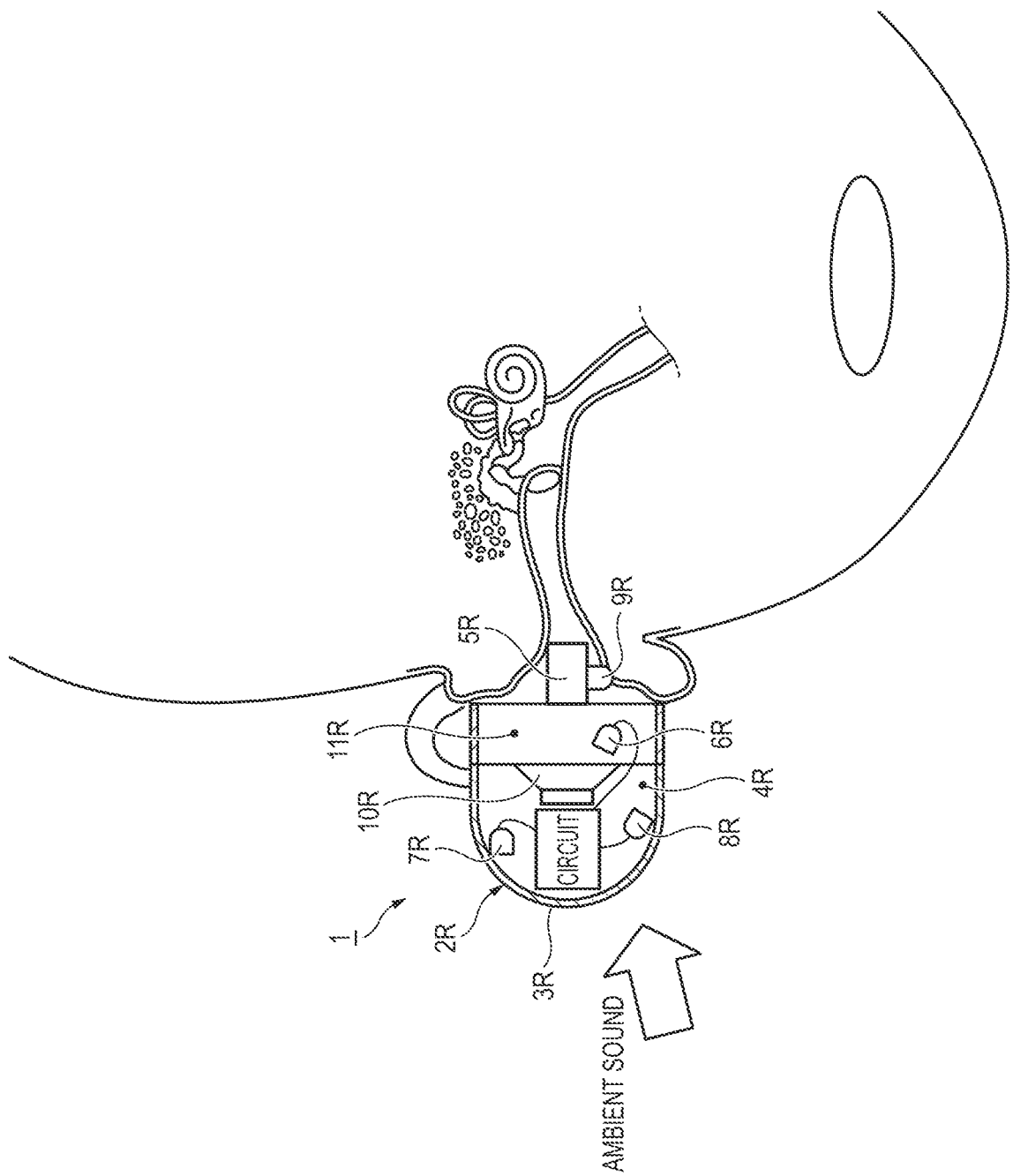
FIG. 1 is a cross-sectional view schematically illustrating an internal hardware configuration of an earphone casing according to a first embodiment.

First, a hardware configuration of an earphone apparatus 1 (an example of an acoustic apparatus) according to the present embodiment will be described with reference to FIG. 1. FIG. 1 is a cross-sectional view schematically illustrating an internal hardware configuration of the earphone casing 2R according to the present embodiment.

In the present embodiment, the right earphone casing 2R and the left earphone casing 2L have the same configurations in the pair of right and left earphone casings 2R and 2L (described later) of the earphone apparatus 1. Therefore, in the accompanying drawings, the same reference numerals are given to the same configurations of the right earphone casing 2R and the left earphone casing 2L. However, "R" is added at an end of a number for one related to a configuration on a right side, and "L" is added to an end of a number for one related to a configuration on a left side, so that the configuration on the right side can be distinguished (identified) from the configuration on the left side. In the following description, only the right earphone casing 2R will be described, and a description of the left earphone casing 2L will be omitted.

As illustrated in FIG. 1, the earphone apparatus 1 is an inner type acoustic apparatus used by being worn in ears of a user U, and includes a pair of right and left earphone casings 2R and 2L (examples of acoustic devices) and an earpiece attached to each of the earphone casings 2R and 2L. The earpiece of the earphone casing 2L for the left ear is not illustrated.

The pair of right and left earphone casings 2R and 2L that constitute the earphone apparatus 1 are provided in pairs on the right and left (that is, the earphone casing 2L for the left ear and the earphone casing 2R for the right ear), and are respectively worn in the left ear and the right ear of the user U. For example, each of the earphone casings 2R and 2L is held in a state of being inserted into an ear canal by an earpiece with respect to the ear of the user U, and this held state is regarded as a usage state of the earphone apparatus 1, and the same applies to the earphone casing 2L for the left ear.

It should be noted in FIG. 1 that for convenience of explanation, only the right earphone casing 2R is illustrated, and an illustration of the left earphone casing is omitted, and the same applies to the left earphone casing 2L as described above, and thus the description thereof will be omitted or simplified below.

In the present embodiment, the earphone apparatus 1 includes wireless communication units 34R and 34L (examples of communication units, see below) that can perform communication according to a communication standard of Bluetooth (registered trademark). The earphone apparatus 1 is wirelessly connected to a sound source apparatus such as a radio apparatus or a music playback apparatus for a music playback use via the wireless communication units 34R and 34L, or a telephone apparatus such as a smartphone P1 (an example of a communication terminal, see below) owned by the user U for a telephone use, or the like. Then, the earphone apparatus 1 receives a sound signal, a music signal, and the like transmitted from these apparatuses, and outputs the sound signal as a sound wave, or collects utterance of the user U and transmits a sound collection result to these apparatuses.

In the present embodiment, the smartphone P1 is described as an example of an apparatus with which the earphone apparatus 1 wirelessly communicates, but the present invention is not limited thereto, and the earphone apparatus 1 can be connected to various apparatuses as long as the wireless communication is possible. In FIG. 1, the earphone apparatus 1 (the right earphone casing 2R) is largely illustrated and emphasized for ease of understanding.

The right earphone casing 2R includes a housing 3R as a structural member, and is formed in a box shape with a rounded outer appearance. The housing 3R is provided by a composite of materials such as synthetic resin, metal, and ceramic, and a storage space (specifically, a rear chamber 4R and a front chamber 11R) is formed inside the housing 3R. The rear chamber 4R and the front chamber 11R are separately provided by a partition plate. The housing 3R is provided with an attachment cylindrical portion (not illustrated) communicating with a front chamber 11R side of the storage space (specifically, the rear chamber 4R and the front chamber 11R).

An earpiece 5R is made of a flexible member such as silicon, and is injection-molded with an inner cylindrical portion (not illustrated) and an outer cylindrical portion (not illustrated). The inner cylindrical portion of the earpiece 5R is inserted and fixed to the attachment cylindrical portion of the housing 3R, and the earpiece 5R is replaceable (detachable) with respect to the attachment cylindrical portion of the housing 3R. The outer cylindrical portion of the earpiece 5R is worn in the ear canal of the user U, and the earpiece 5R is elastically deformed according to a shape of the ear canal to be worn. With the elastic deformation, the earpiece 5R is held in the ear canal of the user U.

The earphone casing 2R includes, as electrical and electronic members, a driver 10R (an example of a sound emitting unit), a plurality of microphones (for example, an internal microphone 6R, an external microphone 7R, and an utterance microphone 8R), a bone conduction sensor 9R (an example of a second sensor), and a circuit board 20R (an example of a signal processing unit and control unit). These electrical and electronic members are mainly stored in the storage space of the housing 3R.

The driver 10R is an electronic component called a speaker or the like, and converts a sound signal into a sound wave (vibration of air) and outputs the sound wave. Specifically, the driver 10R includes a diaphragm (not illustrated), and converts the sound signal into the sound wave by vibrating the diaphragm based on the sound signal input to the driver 10R. The sound wave output from the driver 10R propagates to an eardrum of the ear of the user U through a cavity of the earpiece 5R. In the present embodiment, the driver 10R acoustically emits (outputs) a sound signal or a music signal reproduced by the smartphone P1 owned by the user U via the earpiece 5R.

The plurality of microphones specifically include at least three types of the internal microphone 6R, the external microphone 7R (an example of a first sensor), and the utterance microphone 8R (an example of the first sensor). In the present embodiment, the plurality of microphones (for example, the internal microphone 6R, the external microphone 7R, and the utterance microphone 8R) are disposed in the earphone casing 2R so as to be able to detect a sound around the user U and a sound such as utterance of the user U when the earphone casing 2R is worn to an auricle.

The internal microphone 6R is disposed inside the front chamber 11R which constitutes a part of the storage space of the housing 3R, and a detection portion is disposed so as to face the sound emitting unit of the driver 10 from the front chamber 11R. The internal microphone 6R is disposed as close as possible to the ear canal of the ear of the user U in the front chamber 11R of the housing 3R. Accordingly, the internal microphone 6R collects a sound physically generated in the front chamber 11R including the sound wave output from the driver 10R.

That is, the internal microphone 6R is provided so as to be able to collect, as an echo signal, noise that enters the front chamber 11R through the housing 3R, the earpiece 5R, and the like together with the sound signal or the music signal output from the driver 10R. The internal microphone 6R is electrically connected to the circuit board 20R by a signal line.

The external microphone 7R and the utterance microphone 8R are disposed inside the rear chamber 4R. However, unlike the internal microphone 6R described above, a plurality of through holes (not illustrated) are Ruined in a surface of the housing 3R, and the external microphone 7R and the utterance microphone 8R are fixed to the housing 3R such that a sound outside the earphone casing 2R can be collected through the through holes.

The external microphone 7R is disposed so as to be able to collect an ambient sound and/or wind noise outside the earphone casing 2R. The utterance microphone 8R is disposed so as to be able to collect the utterance of the user U worn with at least one earphone casing 2R, and realizes a so-called hands-free calling together with the driver 10R in a state where the earphone casing 2R can communicate with a mobile telephone apparatus such as the smartphone P1 of the user U.

The bone conduction sensor 9R includes a piezoelectric element (not illustrated) and the like, and converts the vibration transmitted to a human bone of the user U (bone conduction vibration) into an electrical signal. The bone-conduction sensor 9 is attached to the earphone casing 2R so as to be in contact with a facial surface around the ear or a back surface of the auricle. The bone conduction sensor 9R is disposed away from driver 10R. Since a sound uttered by the user U is conducted to a face or a head bone, the bone conduction sensor 9R detects vibration of the human bone, and converts a detection result thereof into an electrical signal and outputs the electrical signal. Presence/absence of the utterance of the user U can be detected by the electrical signal. The bone conduction sensor 9R is electrically connected to the circuit board 20R by a signal line.

The circuit board 20R is formed in a flat plate shape, provided with a plurality of circuits (see below) disposed on a surface, and operates as a control board of the earphone casing 2R that appropriately performs signal processing on the sound signal and the music signal as described in later.

Regarding Configuration of Circuit Board

Figure 2:
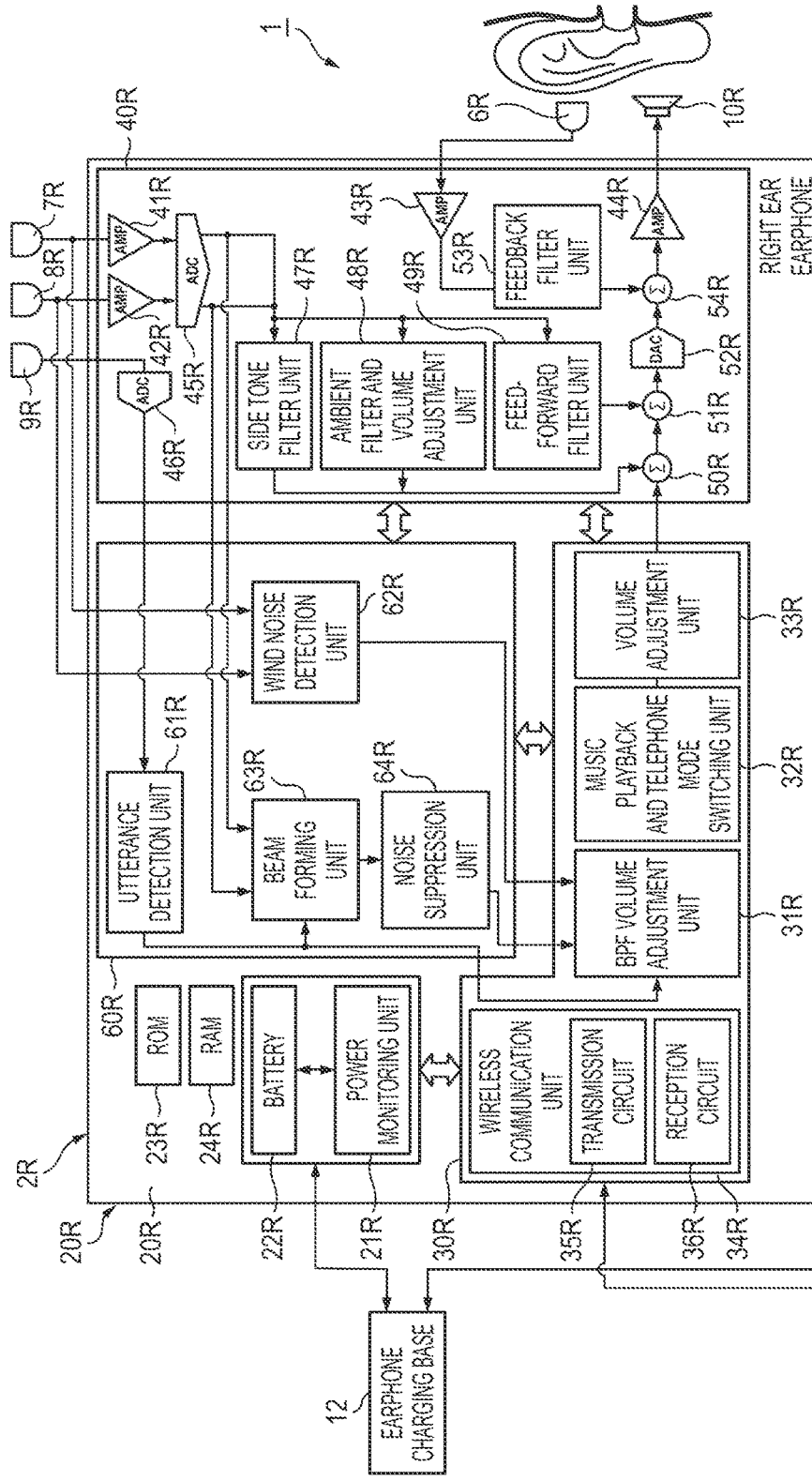
FIG. 2 is a functional block diagram illustrating processing in a circuit board of each of a pair of left and right earphone casings illustrated in FIG. 1.

Next, a configuration of the circuit board 20R will be described with reference to FIG. 2. FIG. 2 is a functional block diagram illustrating processing in the circuit boards 20R and 20L of each of the pair of right and left earphone casings 2R and 2L illustrated in FIG. 1. In the following, the circuit board 20R of one (right) of the right and left earphone casings 2R and 2L is described, and a circuit board 20L of the other (left) has the same configuration as the circuit board 20R of the right. Therefore, as described above, equivalent reference numerals are given in the left circuit board 20L of FIG. 2, and descriptions of the equivalent reference numerals are omitted or simplified.

As illustrated in FIG. 2, the circuit board 20R is configured as a general-purpose control board as described above. Specifically, the circuit board 20R is equipped with at least a main circuit 30R (an example of a detection unit and control unit), an ANC circuit 40R (an example of the control unit), and a detection circuit 60R (an example of a control unit) as arithmetic circuits.

The main circuit 30R, the ANC circuit 40R, and the detection circuit 60R are implemented by using a processor such as a central processing unit (CPU), a micro processing unit (MPU), or a digital signal processor (DSP), control each other consistently by transmitting and receiving a control signal to each other, and exchange a sound signal with a pulse code modulation (PCM) digital signal.

In addition, the circuit board 20R is also equipped with a ROM circuit 23R as a read-only memory circuit and a RAM circuit 24R as a writable memory circuit. Further, the circuit board 20R is also equipped with the battery 22R as a power source for the earphone casing 2R, and a power monitoring unit 21R (an example of a monitoring unit) that detects and monitors a charging state, a power consumption state, a remaining amount of the power, and the like of the battery 22R. The power monitoring unit 21R transmits (outputs) a detection and monitoring result to the main circuit 30R.

A program (not illustrated) as software is stored in the ROM circuit 23R, and the program is executed by the main circuit 30R, the ANC circuit 40R, and the detection circuit 60R serving as arithmetic circuits (see below). The RAM circuit 24R is used as a temporary memory holding circuit in execution thereof. In addition, in the present embodiment, the circuit board 20R is mounted with a plurality of integrated circuits, which specialize in predetermined processing, serving as hardware physically mounted on the circuit board 20R.

That is, each of blocks illustrated inside the main circuit 30R, the ANC circuit 40R, and the detection circuit 60R illustrated in FIG. 3 represents a function implemented by software such as a program or a function implemented by hardware such as a dedicated integrated circuit. ON and OFF of the functions can be controlled by the main circuit 30R, the ANC circuit 40R, and the detection circuit 60R.

In the present embodiment, the function implemented by the circuit board 20R is implemented by both software and hardware, but the present invention is not limited thereto. For example, the entire function may be implemented by hardware as a physical configuration of the "apparatus".

The smartphone P1 owned by the user U of the earphone apparatus 1 and another smartphone P2 including a call partner side are both connected to a mobile phone network 100, and the user U can call, that is, utter or send a calling to the call partner side through the mobile phone network 100. At the time of the utterance or sending a calling, the user U can perform a so-called hands-free calling by using the earphone apparatus 1 of the present embodiment. At the time of performing the hands-free calling, a sound signal of the utterance or sending a calling is exchanged by wireless communication between the smartphone P1 of the user U and the earphone apparatus 1. The earphone casings 2R and 2L constituting the earphone apparatus 1 can individually perform wireless communication with the smartphone P1, but cannot directly communicate with each other. Therefore, the earphone casings 2R and 2L constituting the earphone apparatus 1 can receive data or information transmitted from the smartphone P1. The smartphone P1 of the user U is provided with a display unit D1 such as a display apparatus. As will be described later, the display unit D1 is configured to display various messages based on an instruction from the main circuit 30R of the circuit board 20R.

In addition, the smartphone P1 of the user U is provided with an explicit transition to a first power-saving mode (see below), that is, a (forced) transition setting to the first power-saving mode by an operation of the user U. The transition setting on the smartphone P1 of the user U is detected by the main circuit 30R of the circuit board 20R.

As a specific example, when an application for online conversation (hereinafter, also referred to as "online conversation application".) such as Zoom (registered trademark) or Microsoft Teams (registered trademark) is installed in the smartphone P1, a sound output of the user U side may be set to mute (silence) in this online conversation application. In a state of the mute setting, the earphone casing 2R is substantially not used, and thus, in the present embodiment, a transition to first power-saving is performed by the main circuit 30R in order to save the power of the battery 22R of the earphone casing 2R. Alternatively, the user U may explicitly (forcibly) set the transition to a power-saving mode in a predetermined setting program of the smartphone P1. Such a transition is detected in the main circuit 30R of the circuit board 20R.

The smartphone P1 of the user U is provided such that an operation of the transition to the power-saving mode including the first power-saving mode can be set to ON or OFF as a whole in the predetermined setting program. For example, if the operation of the transition to the power-saving mode is set to OFF as a whole, no transition to the first power-saving mode and a second power-saving mode (see below) is present.

The mobile phone network 100 may include at least a wired or wireless line that enables communication between telephone apparatuses such as the smartphone P1, and may include some or all of Internet lines. In addition, in order to promote the communication between the telephone apparatuses, the mobile phone network 100 may appropriately include a local area network (LAN), a wide area network (WAN), and other types of networks that are used interconnected.

In the present embodiment, as described above, the right earphone casing 2R and the left earphone casing 2L include the batteries 22R and 22L (see below), respectively, and are used to be rechargeable. Further, an earphone charging base 12 (cradle) as a charging apparatus for supplying powers to the right earphone casing 2R and the left earphone casing 2L is also prepared. The right earphone casing 2R and the left earphone casing 2L can be placed on the earphone charging base 12 or removed from the earphone charging base 12, respectively. The earphone charging base 12 supplies the power for charging the battery 22R built in the right earphone casing 2R or the battery 22L built in the left earphone casing 2L, for example, from a personal computer, a car console, or a mobile battery via USB-IF (registered trademark), or from an AC power source via an AC adapter and USB-IF (registered trademark). IF is an abbreviation for an interface. When the right earphone casing 2R or the left earphone casing 2L is placed on the earphone charging base 12, charging from the earphone charging base 12 to the right battery 22R or the left battery 22L is performed through two terminals, for example, by contact of a terminal (not illustrated) provided at the earphone charging base 12 with a terminal (not illustrated) provided at the right earphone casing 2R and connected to the battery 22R, or a terminal (not illustrated) provided at the left earphone casing 2L and connected to the battery 22L. In that case, a control signal or a status signal related to the charging may be exchanged by contact of another terminal (not illustrated) provided at the earphone charging base 12 with another terminal (not illustrated) provided at the right earphone casing 2R and connected to the power monitoring unit 21R, or another terminal (not illustrated) provided at the left earphone casing 2L and connected to a power monitoring unit 21L. Alternatively, when the right earphone casing 2R or the left earphone casing 2L is placed on the earphone charging base 12, the charging from the earphone charging base 12 to the right battery 22R or the left battery 22L may be performed by using magnetic coupling. The right earphone casing 2R or the left earphone casing 2L is placed on the earphone charging base 12 to receive the power supplied from the earphone charging base 12, and a charging state indicating that the earphone charging base 12 is charging the right battery 22R or the left battery 22L is detected by the power monitoring unit 21R or the power monitoring unit 21L, and is transmitted from the wireless communication unit 34R or the wireless communication unit 34L to the smartphone P1 of the user U. The smartphone P1 of the user U is configured to notify the user U of information, such as the transmitted charging state, through the display unit D1 or a sound output unit of the smartphone P1.

The main circuit 30R includes a bandpass filter and volume adjustment unit 31R, a music playback and telephone mode switching unit 32R, a volume adjustment unit 33R, and the wireless communication unit 34R (the example of the communication unit).

In the present embodiment, the main circuit 30R is configured to detect a timing to transition to each of the first power-saving mode and the second power-saving mode. When detecting the timing to transition to the first power-saving mode, the main circuit 30R stops some operations of the functions related to the signal processing in the main circuit 30R, the ANC circuit 40R, and the detection circuit 60R based on the detection. By stopping the operations, power consumption of the battery 22R of the right earphone casing 2R can be made slow, and the remaining amount (life) of the battery 22R can be extended (see below for details). The main circuit 30R is configured to instruct, through the wireless communication unit 34R, the smartphone P1 of the user U to display a predetermined message (for example, a message of prompting an exchange for a use with the other earphone casing, information such as the charging state including the remaining capacity of the battery 22R) on the display unit D1.

The wireless communication unit 34R includes a transmission circuit 35R and a reception circuit 36R, wirelessly connects the right earphone casing 2R to the smartphone P1 of the user U to allow signal transmission and reception, and transmits the processed sound signal to the smartphone P1 of the user U. The transmission circuit 35R transmits various signals including the processed sound signal to the smartphone P1 of the user U, and the reception circuit 36R receives the various signals including the processed sound signal transmitted from the smartphone P1 of the user U. The right earphone casing 2R and the left earphone casing 2L are configured to exchange information with each other via the wireless communication units 34R and 34L. In the present embodiment, the wireless communication unit 34R of the earphone apparatus 1 performs the communication according to the communication standard of Bluetooth (registered trademark), but the present invention is not limited thereto, and the wireless communication unit 34R may be provided to be connectable to a communication line such as WiFi (registered trademark) or a mobile communication line.

The bandpass filter and volume adjustment unit 31R receives control signals of detection results of an utterance detection unit 61R (see below) and a wind noise detection unit 62R (see below) of the detection circuit 60R, and receives a sound signal transmitted from a noise suppression unit 64R (see below) of the detection circuit 60R as a digital signal. In addition, the bandpass filter and volume adjustment unit 31R passes a sound component with a predetermined frequency band of the received sound signal based on the control signals from the detection circuit 60R, and adjusts a volume level of the passed sound signal (for example, the sound signal based on the utterance or the sound signal of an ambient sound of the user U).

That is, the bandpass filter and volume adjustment unit 31R adjusts characteristics of the sound signal based on the utterance of the user U based on the presence or absence of the utterance of the user U and the detection result of the wind noise. The adjusted sound signal is wirelessly transmitted as a transmission signal to the smartphone P1 of the user U through the wireless communication unit 34R of the circuit board 20R. The bandpass filter and volume adjustment unit 31R is provided so as to operate only when the earphone apparatus 1 is for a telephone use.

The music playback and telephone mode switching unit 32R is wirelessly connected to the smartphone P1 of the user U through the wireless communication unit 34R of the circuit board 20R, and receives the sound signal transmitted from the smartphone P1. That is, the music playback and telephone mode switching unit 32R is provided so as to be able to input a sound signal or a music signal for playback from the smartphone P2 of the call partner. The music playback and telephone mode switching unit 32R determines whether an operation mode (use) of the earphone apparatus 1 is for a music playback or the telephone use based on the received sound signal or the control signal transmitted from the smartphone P1, and manages the input.

For example, in the present embodiment, the music playback and telephone mode switching unit 32R receives a sound signal transmitted from the call partner of the user U as a calling reception signal, and determines that the operation mode is for the telephone use based on the reception result. The music playback and telephone mode switching unit 32R switches the operation mode of the earphone apparatus 1 to the telephone use, and transmits the sound signal input to the music playback and telephone mode switching unit 32R to the volume adjustment unit 33R.

With respect to the transmitted sound signal, the volume adjustment unit 33R adjusts a volume level and transmits the volume level to a first digital addition unit 50R (see below) of the ANC circuit 40R.

The main circuit 30R determines a remaining battery amount of the earphone casing 2R based on an output of the power monitoring unit 21R and transmits the remaining battery capacity to the smartphone P1, and when a switching instruction for preventing uneven wear is received from the smartphone P1, the main circuit 30R turns off uses of the external microphone 7R, the utterance microphone 8R, the bone conduction sensor 9R, the ANC circuit 40R, and the detection circuit 60R (an example of the power-saving mode). When a re-switching instruction for preventing the uneven wear is received from the smartphone P1 after a predetermined time (for example, 10 minutes) has elapsed, the main circuit 30R turns on the uses of the external microphone 7R, the utterance microphone 8R, the bone conduction sensor 9R, the ANC circuit 40R, and the detection circuit 60R which are turned off. That is, by using one of the earphone casings 2R and 2L as the earphone casing used every predetermined time (for example, 10 minutes) described above, the earphone apparatus 1 can be used for a long time.

The ANC circuit 40R includes a first amplifier unit 41R, a second amplifier unit 42R, a third amplifier unit 43R, a fourth amplifier unit 44R, a first analog-to-digital conversion unit 45R, a second analog-to-digital conversion unit 46R, a side tone filter unit 47R, an ambient filter and volume adjustment unit 48R (an example of a signal processing unit), a feedforward filter unit 49R (an example of the signal processing unit), the first digital addition unit 50R, a second digital addition unit 51R, a digital-to-analog conversion unit 52R, a feedback filter unit 53R (an example of the signal processing unit), and an analog addition unit 54R.

The first amplifier unit 41R is electrically connected to the external microphone 7R, amplifies a sound signal output from the external microphone 7R, and outputs the amplified sound signal to the first analog-to-digital conversion unit 45R.

The second amplifier unit 42R is electrically connected to the utterance microphone 8R, amplifies a sound signal output from the utterance microphone 8R, and outputs the amplified sound signal to the first analog-to-digital conversion unit 45R.

The first analog-to-digital conversion unit 45R converts two-channel analog signals based on the utterance microphone 8R or the external microphone 7R into digital signals. The first analog-to-digital conversion unit 45R transmits the two-channel digital signals to the side tone filter unit 47R, the ambient filter and volume adjustment unit 48R, the feedforward filter unit 49R, and a beam forming unit 63R (see below) of the detection circuit 60R.

The second analog-to-digital conversion unit 46R is electrically connected to the bone conduction sensor 9R, and converts an electrical signal output from the bone conduction sensor 9R into a digital signal. The second analog-todigital conversion unit 46R transmits the digital signal to the utterance detection unit 61R (see below) of the detection circuit 60R.

The side tone filter unit 47R receives the two-channel digital signals of the sound transmitted from the first analog-to-digital conversion unit 45R. The digital signals of the sound are based on the external microphone 7R and the utterance microphone 8R, and the side tone filter unit 47R transmits the digital signals of the sound to the first digital addition unit 50R.

That is, when the earphone apparatus 1 is for the telephone use, the external microphone 7R and the utterance microphone 8R collect the utterance of the user U. Therefore, due to an operation of the side tone filter unit 47R, a part of the utterance of the user U is looped back (added) to the sound signal output to the driver 10R as a result. Accordingly, the user U can listen to the sound uttered by the user U with the earphone apparatus 1, and can easily perform the utterance when the earphone apparatus 1 is for the telephone use. The side tone filter unit 47R is set to operate only when the earphone apparatus 1 is for the telephone use.

Similarly, the ambient filter and volume adjustment unit 48R receives the two-channel digital signals of the sound output from the first analog-to-digital conversion unit 45R. The ambient filter and volume adjustment unit 48R mainly extracts a low-frequency component from the two-channel sound signals, adjusts a volume level of the extracted component, and transmits the extracted component to the first digital addition unit 50R.

In a normal usage state of the earphone apparatus 1, the earpiece 5R or the like prevents the ambient sound of the user U from transmitting into the auricle of the user U. Therefore, by an operation of the ambient filter and volume adjustment unit 48R, the ambient sound such as vehicle noise or alarm sirens is actively captured through the external microphone 7R and the utterance microphone 8R, and the ambient sound can be electrically passed from the outside to the ear canal of the user U. Accordingly, the user U can know a state of the ambient sound even when the earphone apparatus 1 (right earphone casing 2R) is worn. The operation of the ambient filter and volume adjustment unit 48R is controlled to be turned on (ON) or off (OFF) by an operation system or an application installed in the smartphone P1 or the like of the user U.

Similarly, the feedforward filter unit 49R also receives the two-channel digital signals of the sound output from the first analog-to-digital conversion unit 45R. The feedforward filter unit 49R performs filter processing centering on a midrange (medium frequency) component containing a large amount of human sounds, and transmits the processing result to the second digital addition unit 51R.

The first digital addition unit 50R adds the digital signal of the sound transmitted from the side tone filter unit 47R or the ambient filter and volume adjustment unit 48R and the digital signal of the sound transmitted from the volume adjustment unit 33R of the main circuit 30R, and then transmits the signal to the second digital addition unit 51R.

The second digital addition unit 51R receives the digital signals of the sound transmitted from the first digital addition unit 50R and the feedforward filter unit 49R, adds these digital signals, and then transmits the addition result to the digital-to-analog conversion unit 52R.

The digital-to-analog conversion unit 52R converts the addition result into an analog signal, and outputs the converted analog signal to the analog addition unit 54R.

The third amplifier unit 43R is electrically connected to the internal microphone 6R, amplifies the sound signal (that is, the echo signal) output from the internal microphone 6R, and outputs the amplified sound signal to the feedback filter unit 53R.

The feedback filter unit 53R converts an analog signal based on the internal microphone 6R in an anti-phase manner to generate an anti-phase signal, and outputs the anti-phase signal to the analog addition unit 54R.

The analog addition unit 54R adds, as an analog signal, the sound signal output from the digital-to-analog conversion unit 52R and the sound signal (the anti-phase signal) output from the feedback filter unit 53R, and then outputs the analog signal to the fourth amplifier unit 44R.

Here, as described above, the internal microphone 6R cannot be completely suppressed by the earpiece 5R or the like, and the noise that enters the auricle of the user U is collected as an echo together with the sound signal or the music signal output from the driver 10R. The feedback filter unit 53R converts the collected sound signal of the echo in an anti-phase manner to generate an anti-phase signal of the analog signal. The analog addition unit 54R adds the anti-phase signal to the analog signal immediately before being output to the driver 10R. By adding these analog signals, the above-mentioned noise can be actively removed.

In this way, according to the feedback filter unit 53R and the analog addition unit 54R, the noise contained in the sound signal from the smartphone P1 of the user U is reduced based on the signal that a part of the sound signal output from the driver 10R wraps around the internal microphone 6R and is collected.

The fourth amplifier unit 44R is electrically connected to the driver 10R, amplifies the analog signal output from the analog addition unit 54R, and outputs the amplified analog signal to the driver 10R. The driver 10 outputs a signal such as the sound signal or the music signal as a physical air vibration (sound wave) based on the input.

Similarly, operations of the feedback filter unit 53R and the analog addition unit 54R are controlled to be turned on or off by the application installed in the smartphone P1 or the like, and the on or off can be freely changed by the user U. When set to OFF in this way, a control signal related to the setting is transmitted to the analog addition unit 54R. The analog addition unit 54R controls the sound signal from the feedback filter unit 53R so as not to be input to the analog addition unit 54R based on the control signal.

The detection circuit 60R includes the utterance detection unit 61R, the wind noise detection unit 62R, the beam forming unit 63R (an example of the signal processing unit), and the noise suppression unit 64R (an example of the signal processing unit).

The utterance detection unit 61R is connected to the second analog-to-digital conversion unit 46R of the ANC circuit 40R, and receives a digital signal transmitted from the second analog-to-digital conversion unit 46R. The digital signal is a signal based on the bone conduction sensor 9R. The utterance detection unit 61R detects bone conduction vibration caused by the utterance of the user U by the digital signal, and determines (detects) the presence or absence of the utterance of the user U. This detection result is transmitted as a control signal to the beam forming unit 63R and the bandpass filter and volume adjustment unit 31R of the main circuit 30R.

The wind noise detection unit 62R is directly electrically connected to the external microphone 7R and the utterance microphone 8R, and receives the analog signals before being amplified by the first amplifier unit 41R and the second amplifier unit 42R. The analog signals are two-channel analog signals based on the external microphone 7R and the utterance microphone 8R. The wind noise detection unit 62R detects the wind noise generated around the user U by the two-channel analog signals, and determines (detects) the presence or absence of the wind noise.

Further, the wind noise detection unit 62R reads, for example, a threshold stored in a memory of the circuit board 20R in advance, and determines whether the two-channel digital signals are equal to or higher than a predetermined threshold, so that a level (intensity) of the wind noise and/or the ambient sound can be detected.

As a specific example, the wind noise detection unit 62R of the present embodiment calculates a correlation of the two-channel ambient sounds respectively collected by the external microphone 7R and the utterance microphone 8R, and intensity levels of the ambient sounds. Since general sounds are often correlated with each other, as a result of the calculation, when it is determined that the two-channel ambient sounds are uncorrelated with each other and the intensity levels are high, the wind noise detection unit 62R can determine that the wind noise is present.

In this way, the wind noise detection unit 62R detects the presence or absence of the wind noise around the user U based on the ambient sounds respectively collected by the external microphone 7R and/or the utterance microphone 8R, and in the present embodiment, this detection result is transmitted to the bandpass filter and volume adjustment unit 31R of the main circuit 30R.

The beam forming unit 63R is connected to the first analog-to-digital conversion unit 45R of the ANC circuit 40R, and receives the two-channel digital signals transmitted from the first analog-to-digital conversion unit 45R. The beam forming unit 63R performs the sound processing for suppressing a sound other than the utterance of the user U on the two-channel digital signals. By the sound processing, the beam forming unit 63R enhances a directivity for the sound physically emitted from a mouth of the user U and collects the sound, and as a result, in a case of the so-called hands-free calling, a sound that is easy for the call partner to hear can be transmitted (sent).

The beam forming unit 63R transmits the digital signal of sound enhancing the directivity for the mouth of the user U to the noise suppression unit 64R. The noise suppression unit 64R performs noise suppression processing on the received digital signal of the sound, and transmits the processing result to the bandpass filter and volume adjustment unit 31R of the main circuit 30R.

The right earphone casing 2R of the pair of right and left earphone casings 2R and 2L has been described above, and the configuration of the left earphone casing 2L (the other) is the same as the configuration of the right earphone casing 2R described above.

Regarding Processing Flow in First Power-Saving Mode Performed by Circuit Board

Next, a processing flow in the first power-saving mode performed by the circuit boards 20R and 20L according to the present embodiment will be described with reference to FIG. 3. FIG. 3 is a flowchart illustrating the processing flow in the first power-saving mode performed by the circuit boards 20R and 20L illustrated in FIG. 2.

As illustrated in FIG. 3, the smartphone P1 of the user U determines whether an operation of the transition to the power-saving mode including the first power-saving mode is set to ON as a whole in a predetermined setting application (S101). If it is determined in the determination result that the power-saving mode is not set to ON, that is, set to OFF (NO in S101), the processing flow ends (END).

Meanwhile, if it is determined that the power-saving mode is set to ON (YES in S101), main circuits 30R and 30L of the circuit boards 20R and 20L detect the remaining amounts (remaining capacities) of the batteries 22R and 22L through the power monitoring units 21R and 21L, and transmit the detection results to the smartphone P1 of the user U (S102). The smartphone P1 of the user U determines which of the remaining amounts is small based on the detection results of the remaining battery amounts of the batteries 22R and 22L respectively transmitted from the main circuits 30R and 30L of the circuit boards 20R, 20L, and transmits, to the circuit boards 20R and 20L of the earphone casings 2R and 2L, an instruction to turn off the uses of the external microphone 7R, the utterance microphone 8R, the bone conduction sensor 9R, the ANC circuit 40R, and the detection circuit 60R of one (for example, the earphone casing 2R) having the smaller remaining amount (S103). The main circuit 30R turns off the uses of the external microphone 7R, the utterance microphone 8R, the bone conduction sensor 9R, the ANC circuit 40R, and the detection circuit 60R based on the instruction from the smartphone P1. Meanwhile, even if the main circuit 30L receives the instruction from the smartphone P1, an external microphone 7L, an utterance microphone 8L, a bone conduction sensor 9L, an ANC circuit 40L, and a detection circuit 60L are continued to be used without being turned off.

The smartphone P1 determines whether the predetermined time (for example, 10 minutes) has elapsed since the above-mentioned off instruction was transmitted to the main circuits 30R and 30L (S104). If the smartphone P1 determines that the predetermined time (for example, 10 minutes) has elapsed since the above-mentioned off instruction was transmitted (YES in S104), the smartphone P1 transmits, to the main circuits 30R and 30L, a switching instruction to switch the uses of the external microphone, the utterance microphone, the bone conduction sensor, the ANC circuit, and detection circuit to an opposite side (that is, the earphone casing side that is turned off) (S105). Accordingly, when receiving the switching instruction from the smartphone P1, the main circuit 30R turns on the uses of the external microphone 7R, the utterance microphone 8R, the bone conduction sensor 9R, the ANC circuit 40R, and the detection circuit 60R which are turned off. In addition, when receiving the switching instruction from the smartphone P1, the main circuit 30L turns off the uses of the external microphone 7L, the utterance microphone 8L, the bone conduction sensor 9R, the ANC circuit 40L, and the detection circuit 60L.

The main circuits 30R and 30L detect the remaining amounts (remaining capacities) of the batteries 22R and 22L through the power monitoring units 21R and 21L, and determine whether both the detected remaining amounts are equal to or lower than a predetermined time threshold, that is, equal to or lower than 30 [min (minutes)] as an example of the present embodiment (S106).

If it is determined in the determination result that the detected remaining amounts are not equal to or lower than the predetermined time threshold (NO in S106), the processing flow returns to step S102. That is, the processing flow does not proceed to steps after S107 unless the remaining amounts of the powers of the batteries 22R and 22L of the pair of right and left earphone casings 2R and 2L are equal to or lower than the predetermined time. The above-mentioned predetermined time threshold is stored and held in ROM circuits 23R and 23L. In the present embodiment, 30 [min (minutes)] is set as an example value, but the present invention is not limited thereto. Appropriate values are selected according to various situations.

If it is determined that the remaining amounts of the powers of the batteries 22R and 22L are equal to or lower than the predetermined time threshold (YES in S106), the circuit boards 20R and 20L cause the display unit D1 of the smartphone P1 of the user U to display a message of "start power-saving mode" through the wireless communication units 34R and 34L (S107). By the display, the earphone apparatus 1 notifies the user U that either the right earphone casing 2R or the left earphone casing 2L is in the power-saving mode. At the time of the notification, the user U is also prompted to charge the earphone casings 2R and 2L, respectively.

Wind noise detection units 62R and 62L detect the ambient sound of the user U based on the two-channel detection signals based on the external microphones 7R and 7L and the utterance microphones 8R and 8L, and detect the level of the ambient sound. That is, the wind noise detection units 62R and 62L determine whether levels of the detection signals of the external microphones 7R and 7L are equal to or lower than a predetermined level threshold (an example of a first predetermined value), that is, are equal to or lower than 10 [dBV] as an example of the present embodiment (S108). If it is determined in the determination result that the levels of the detection signals are not equal to or lower than the predetermined level threshold (NO in S108), the processing flow returns to step S108. That is, the processing flow does not proceed to steps after S109 unless the detection signals of the external microphones 7R and 7L are equal to or lower than the predetermined level threshold.

If it is determined that the detection signals of the external microphones 7R and 7L are equal to or lower than the predetermined level threshold (YES in S108), in this case, the wind noise detection units 62R and 62L determine whether levels of the detection signals of the utterance microphones 8R and 8L are equal to or lower than a predetermined level threshold (an example of the first predetermined value), that is, similarly are equal to or lower than 10 [dBV] as an example of the present embodiment (S109). Similarly, if it is determined in the determination result of this step that the levels of the detection signals are not equal to or lower than the predetermined level threshold (NO in S109), the processing flow returns to step S108.

Meanwhile, if it is determined that the detection signals of the utterance microphones 8R and 8L are equal to or lower than the predetermined level threshold (YES in S109), utterance detection units 61R and 61L determine whether the detection signals of the bone conduction sensors 9R and 9L are equal to or lower than a predetermined level threshold (an example of the first predetermined value), that is, similarly are equal to or lower than 10 [dBV] same as an example of the present embodiment (S110). If it is determined in the determination result that the detection signals are not equal to or lower than the predetermined level threshold (NO in S110), the processing flow returns to step S108.

That is, according to steps S108 to S110, if the detection signals of the external microphones 7R and 7L, the utterance microphones 8R and 8L, or the bone conduction sensors 9R and 9L are not equal to or lower than the predetermined level threshold, the processing step does not transition to the first power-saving mode after S111.

In other words, the first power-saving mode can be transitioned into only when the detection signals of the external microphones 7R and 7L, the utterance microphones 8R and 8L, or the bone conduction sensors 9R and 9L are equal to or lower than the predetermined level threshold. The main circuits 30R and 30L detect the timing to transition to the first power-saving mode based on the detection. When attention is limited to the detection signals of the utterance microphones 8R and 8L, the main circuits 30R and 30L detect the timing to transition to the first power-saving mode based on the detection of the utterance of the user U. Moreover, the above-mentioned predetermined level threshold is also stored and held in the ROM circuits 23R and 23L. In the present embodiment, 10 [dBV] is set as an example of the threshold, but the present invention is not limited thereto. Similarly, appropriate values are selected according to various situations. Different values may be set for the predetermined level thresholds.

As described above, the power-saving mode transitions into the first power-saving mode, and the main circuits 30R and 30L detect the timing to transition to the first power-saving mode. Based on the detection, the main circuits 30R and 30L stop some of the functions related to sound signal processing in the main circuits 30R and 30L themselves, the ANC circuits 40R and 40L, and the detection circuits 60R and 60L.

Specifically, the main circuits 30R and 30L output instructions to the ANC circuits 40R and 40L, and control functions of feedforward filter units 49R and 49L and feedback filter units 53R and 53L (including third amplifier units 43R and 43L) of the ANC circuits 40R and 40L to turn off to stop these functions (S111). Similarly, the main circuits 30R and 30L output the instructions to the detection circuits 60R and 60L, and control functions of beam forming units 63R and 63L and noise suppression units 64R and 64L of the detection circuits 60R and 60L to turn off to stop these functions (S112, S113). Further, the main circuits 30R and 30L also output instructions to the ANC circuits 40R and 40L, and control functions of ambient filter and volume adjustment units 48R and 48L of the ANC circuits 40R and 40L to turn off to stop the functions (S114).

Then, the circuit boards 20R and 20L determine, for example, whether the mute setting is set to ON for a sound output of the user U by in the online conversation application of the smartphone P1 of the user U (S115). If it is determined in the determination result that the mute setting is not set to ON, that is, is set to OFF in the online conversation application (NO in S115), the main circuits 30R and 30L cannot detect a final timing to transition to the first power-saving mode, and the processing flow returns to step S101.

Meanwhile, if it is determined in the determination result that the mute setting is set to ON (YES in S115) in the online conversation application, in other words, if the main circuits 30R and 30L detect the timing to transition to the first power-saving mode based on the instruction from the user U, functions of transmission circuits 35R and 35L of the wireless communication units 34R and 34L are set to off and operations are stopped (S116). Further, the main circuits 30R and 30L reduce (decrease) a reception bit rate of the sound signal from the smartphone P1 of the user U by a predetermined amount during the first power-saving mode (S117). Due to the decrease in the bit rate, information processing amounts per unit time of the circuit boards 20R and 20L are decreased, and as a result, the power consumption of the right earphone casing 2R or the left earphone casing 2L can be suppressed.

Figure 4:
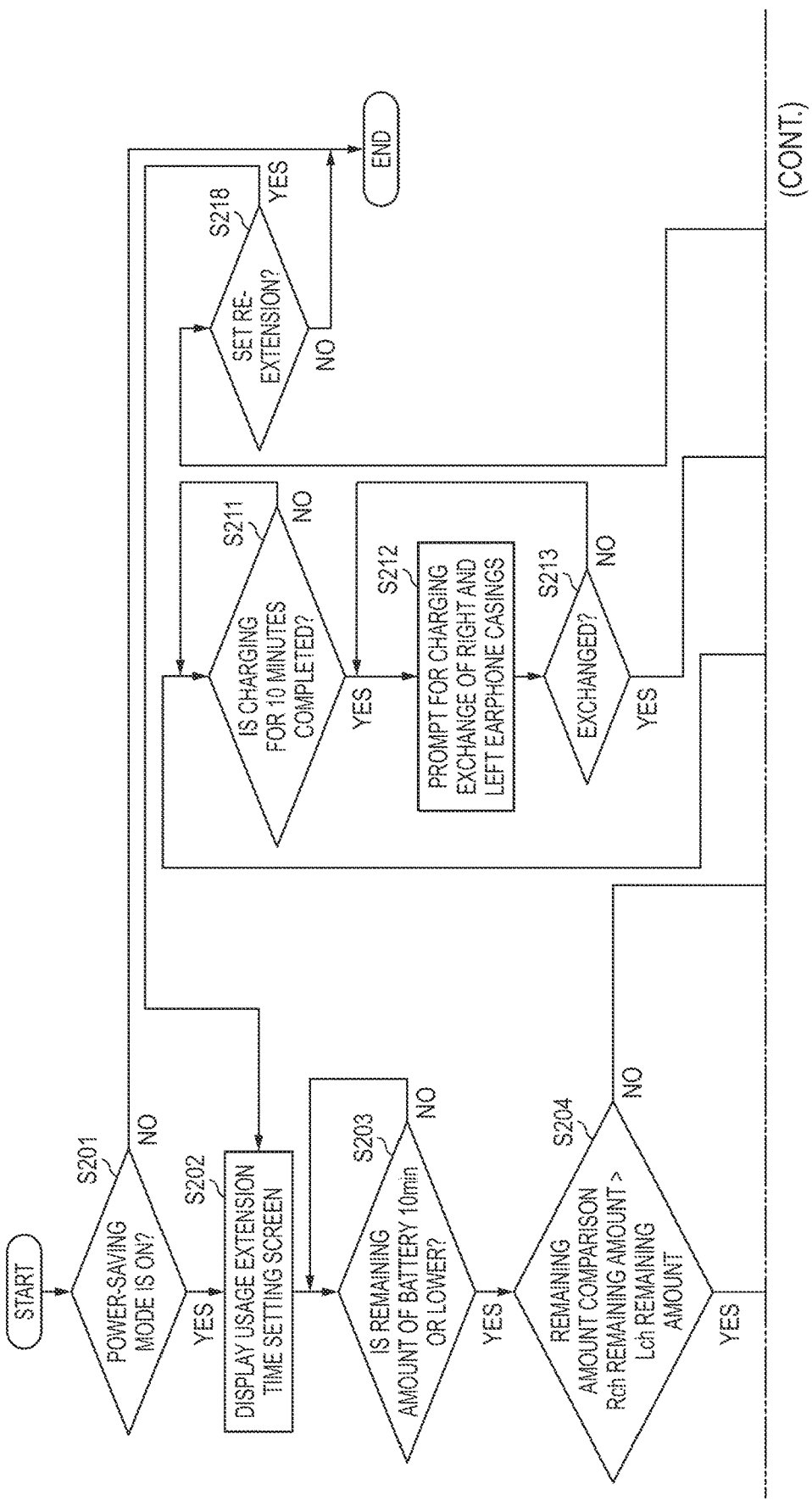
FIG. 4 is a flowchart illustrating a processing flow in a second power-saving mode performed by the circuit board illustrated in FIG. 2.
Figure 5:
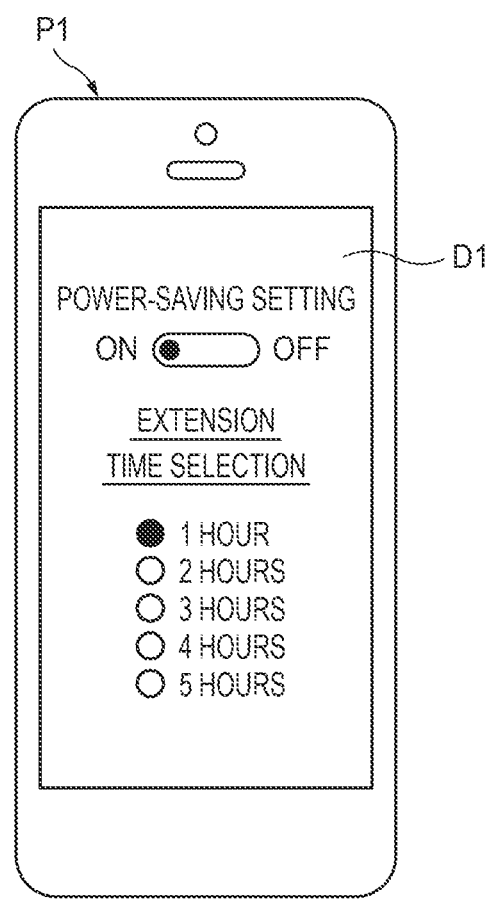
FIG. 5 is a schematic diagram illustrating a display on a screen of a smartphone of a user illustrated in FIG. 1.
Figure 6:
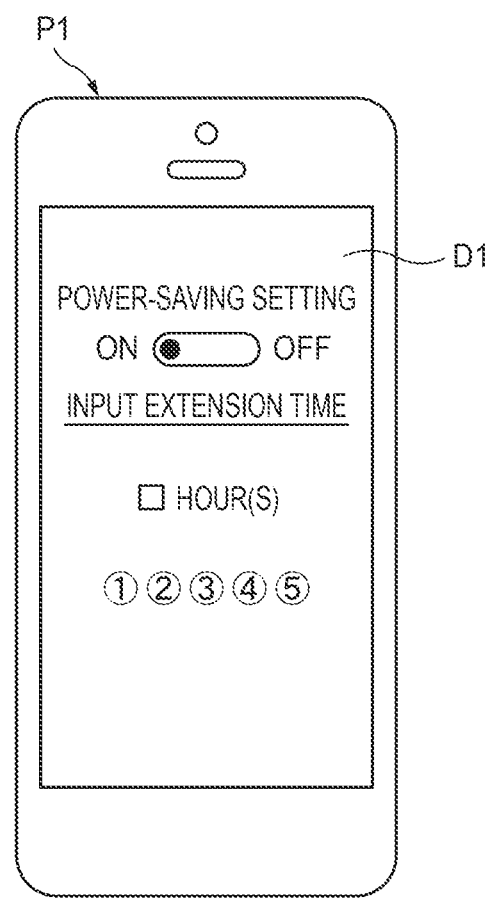
FIG. 6 is a schematic diagram illustrating a display different from the example in FIG. 5.

Regarding Processing Flow in Second Power-Saving Mode Performed by Circuit Board Next, a processing flow in the second power-saving mode performed by the circuit boards 20R and 20L according to the present embodiment will be described with reference to FIGS. 4 to 6. FIG. 4 is a flowchart illustrating the processing flow in the second power-saving mode performed by the circuit boards 20R and 20L illustrated in FIG. 2. FIG. 5 is a schematic diagram illustrating a display on a screen of the smartphone P1 of the user U illustrated in FIG. 1. FIG. 6 is a schematic diagram illustrating a display different from the example in FIG. 5.

As illustrated in FIG. 4, the smartphone P1 of the user U determines whether the operation of the transition to the power-saving mode including the first power-saving mode and the second power-saving mode is set to ON as a whole in a predetermined setting application (S201). If it is determined in the determination result that the power-saving mode is not set to ON, that is, set to OFF (NO in S201), the processing flow ends (END).

Meanwhile, if it is determined that the power-saving mode is set to ON (YES in S201), a usage extension time setting screen is displayed on the display unit D1 of the smartphone P1 of the user U as illustrated in FIG. 5 (S202). The usage extension time setting screen is for allowing the user U to set a usage extension time of the earphone apparatus 1, and in the present embodiment, the screen is a selection method, and one extension time can be selected from the plurality of extension times listed by a radio button or the like. The usage extension time setting screen is not limited to the selection method, but may be an input method as illustrated in FIG. 6, and is freely selected in consideration of an operability for the user U.

The main circuits 30R and 30L of the circuit boards 20R and 20L detect the remaining amounts of the powers of the batteries 22R and 22L through the power monitoring units 21R and 21L. The main circuits 30R and 30L determine whether the remaining amounts of the powers are equal to or lower than a predetermined time threshold, that is, equal to or lower than 10 [min (minutes)] as an example of the present embodiment (S203). If it is determined in the determination result that the remaining amounts of the powers are not equal to or lower than the predetermined time threshold (NO in S203), the processing flow returns to step S203. That is, the processing flow does not proceed to steps after S204 unless the remaining amount of the power of the battery 22R or 22L of the right earphone casing 2R or the left earphone casing 2L is equal to or lower than the predetermined time. Moreover, the above-mentioned predetermined time threshold is also stored and held in the ROM circuits 23R and 23L. In the present embodiment, 10 [min (minutes)] is set as an example value, but the present invention is not limited thereto. Appropriate values are selected according to various situations.

If it is determined that the remaining amounts of the powers of the batteries 22R and 22L are equal to or lower than the predetermined time threshold (YES in S203), the main circuits 30R and 30L detect the timing to transition to the second power-saving mode. Based on the detection, the main circuits 30R and 30L exchange information through the wireless communication units 34R and 34L on the right and left, respectively, and compare the batteries 22R and 22L of the right earphone casing 2R and the left earphone casing 2L to determine whose remaining amount is smaller (S204).

If it is determined from the comparison result that the battery 22L of the left earphone casing 2L has the smaller remaining amount, the left main circuit 30L lowers a volume of a sound signal acoustically output from the left earphone casing 2L to a predetermined volume level by −6 [dB] (an example of a second predetermined value) as an example in the present embodiment during the second power-saving mode (S205). The above-mentioned predetermined volume level is also stored and held in the ROM circuits 23R and 23L. In the present embodiment, −6 [dB] is set as an example value, but the present invention is not limited thereto. Appropriate values are selected according to various situations.

Then, through the wireless communication unit 34L, the left main circuit 30L causes the display unit D1 of the smartphone P1 of the user U to display (output) a message of prompting the user U to charge the left earphone casing 2L for a predetermined time (S206). Accordingly, the right and left main circuits 30R and 30L and the smartphone P1 of the user U make only the other of the batteries 22R and 22L of the earphone casings 2R and 2L, which has a larger remaining capacity, that is, the right earphone casing 2R continued to be used.

After displaying the message, the left main circuit 30L determines whether charging of the battery 22L of the left earphone casing 2L is started based on the transmission of the power monitoring unit 21L (S207). If it is determined in the determination result that the user U does not set the left earphone casing 2L on the earphone charging base 12 and the charging is not started, the processing flow returns to step S206. That is, the processing flow does not proceed to steps after S211 unless the user U sets the left earphone casing 2L on the earphone charging base 12 while the remaining amount of the battery 22L of the left earphone casing 2L is small.

Meanwhile, if it is determined from the above-mentioned comparison result of the remaining amounts of the batteries 22R and 22L that the remaining amount of the battery 22R of the right earphone casing 2R is smaller, the same processing as for the left earphone casing 2L is executed for the right earphone casing 2R. That is, the main circuit 30R of the right earphone housing 2R lowers the volume of the sound signal acoustically output from the right earphone casing 2R by a predetermined volume level (for example, −6 [dB]) during the second power-saving mode (S208). Then, the right main circuit 30R causes the display unit D1 of the smartphone P1 of the user U to display a message of prompting to charge the right earphone casing 2R for a predetermined time (S209).

After displaying the message, the right main circuit 30R determines whether the charging of the battery 22R of the right earphone casing 2R is started (S210). If it is determined in the determination result that the charging is not started, the processing flow returns to step S209. That is, the processing flow does not proceed to steps after S211 unless the user U sets the right earphone casing 2R on the earphone charging base 12 while the remaining amount of the battery 22R of the right earphone casing 2R is small.

If it is determined that the charging of the battery 22R or 22L of the right earphone casing 2R or the left earphone casing 2L is started, the right main circuit 30R or the left main circuit 30L determines whether the charging for the predetermined time, that is, 10 [min (minutes)] as the example in the present embodiment is completed based on the transmission (output) of the power monitoring unit 21R or 21L (S211). If it is determined from the determination result that the charging for the predetermined time is not completed (NO in S211), the processing flow returns to step S211. That is, the processing flow does not proceed to steps after S212 unless the charging for the predetermined time is completed. The value for the predetermined time described above is also stored and held in the ROM circuits 23R and 23L. In the present embodiment, 10 [min (minutes)] is set as an example value, but the present invention is not limited thereto. Appropriate values are selected according to various situations.

Meanwhile, if it is determined that the charging for the predetermined time is completed (YES in S211), that is, if the completion of the charging of one of the earphone casings 2R and 2L for the predetermined time is detected based on the outputs of the power monitoring units 21R and 21L, the main circuits 30R and 30L also notify, through the display unit D1 of the smartphone P1 of the user U, a massage of prompting the user U to charge the other of the earphone casings 2R and 2L (prompting for charging exchange between the right earphone casing 2R and the left earphone casing 2L) for a predetermined time (S212).

The main circuits 30R and 30L determine whether the charging exchange is performed on any of the earphone casings 2R and 2L (S213). Specifically, when determining that any of the earphone casings is placed on the earphone charging base 12 based on the outputs of the power monitoring unit 21R and 21L, the main circuits 30R and 30L notify the smartphone P1 that the earphone casing is placed on the earphone charging base 12. The smartphone P1 recognizes the charging state of any of the earphone casings placed on the earphone charging base 12. The main circuits 30R and 30L notify the smartphone P1 that the other earphone casing charged by the earphone charging base 12 is removed from the earphone charging base 12. By receiving this notification, the smartphone P1 can determine that the earphone casing charged by the earphone charging base 12 is exchanged, and transmits this determination result to the main circuits 30R and 30L. Processing after step S214 is not started until the main circuits 30R and 30L determine that the charging of any of the earphone casings 2R and 2L is exchanged. Accordingly, the main circuits 30R and 30L make only one of the earphone casings 2R and 2L whose charging for a predetermined time is completed continued to be used.

The user U performs the charging exchange on the right earphone casing 2R and the left earphone casing 2L, and the main circuits 30R and 30L determine whether the charging of the other of the batteries 22R and 22L of the earphone casing 2R and 2L for a predetermined time (for example, 10 minutes) is completed (S214). If it is determined in the determination result that the charging for the predetermined time (for example, 10 minutes) is not completed (NO in S214), the processing flow returns to step S212. That is, the processing flow does not proceed to steps after S214 unless the charging for the predetermined time is completed.

If it is determined that the other of the batteries 22R and 22L of the earphone casings 2R and 2L is charged for the predetermined time (YES in S214), the main circuits 30R and 30L causes the display unit D1 of the smartphone P1 of the user U to display a message that the charging is completed through the wireless communication units 34R and 34L (S215).

Then, the smartphone P1 of the user U wirelessly communicates with the earphone charging base 12, and determines whether both the right earphone casing 2R and the left earphone casing 2L are in a state of being removed from the earphone charging base 12 (S216). If it is determined in the determination result that the earphone casings are not removed from the earphone charging base 12 (NO in S216), the processing flow returns to step S214. That is, if the user U does not remove the right earphone casing 2R or the left earphone casing 2L from the earphone charging base 12, the processing flow does not proceed to steps after S217.

If it is determined that the earphone casings are removed from the earphone charging base 12 (YES in S216), both the right earphone casing 2R and the left earphone casing 2L can be wirelessly connected to the smartphone P1 of the user U (S217). Accordingly, the user U can use the earphone apparatus 1 again in a normal state (stereo).

Next, the smartphone P1 of the user U determines whether use extension of the earphone apparatus 1 is reset (S218). If it is determined in the determination result that the use extension is not reset (NO in S218), the processing flow ends (END). Meanwhile, if it is determined that the use extension is reset (YES in S218), the processing flow returns to step S202, and the above-mentioned steps S202 to S218 are repeatedly executed.

As described above, the earphone apparatus 1 (the example of the acoustic apparatus) of the first embodiment includes two earphone casings 2R and 2L (the examples of the acoustic devices) respectively worn in the left ear and the right ear of the user U. The earphone casings 2R and 2L respectively include: the main circuits 30R and 30L (examples of the detection units) that respectively detect the transition timings to the first power-saving mode and the second power-saving mode; the batteries 22R and 22L; the power monitoring units 21R and 21L (examples of the monitoring units) that monitor the remaining capacities of the batteries 22R and 22L; the feedforward filter units 49R and 49L, the feedback filter units 53R and 53L, the beam forming units 63R and 63L, the noise suppression units 64R and 64L, and the ambient filter and volume adjustment units 48R and 48L (examples of the signal processing units) that process an input sound signal; drivers 10R and 10L (examples of the sound emitting units) that acoustically output the processed sound signal; the wireless communication units 34R and 34L (examples of the communication units) that are connected to the smartphone P1 (the example of the communication terminal) owned by the user U to allow the signal transmission and reception, and transmit the processed sound signal to the smartphone P1 (the example of the communication terminal) of the user U; and the main circuits 30R and 30L (examples of the control units) that stop the operations of the feedforward filter units 49R and 49L, the feedback filter units 53R and 53L, the beam forming units 63R and 63L, the noise suppression units 64R, 64L, and the ambient filter and volume adjustment units 48R and 48L based on the detection of the timing to transition to the first power-saving mode. Based on the detection of the tuning to transition to the second power-saving mode, the main circuits 30R and 30L notify of prompting the user U to charge one of the batteries 22R and 22L of the earphone casings 2R and 2L, which has a smaller remaining capacity, for a predetermined time, and continues to use only the other of the batteries 22R and 22L of the earphone casings 2R and 2L, which has a larger remaining capacity.

In addition, an acoustic control method of the first embodiment is an acoustic control method for controlling two earphone casings 2R and 2L (the examples of the acoustic devices) respectively including the batteries 22R and 22L and respectively worn in the left ear and the right ear of the user U. For each of the earphone casings 2R and 2L, the acoustic control method includes: a detection step of detecting the timing to transition to each of the first power-saving mode and the second power-saving mode; a monitoring step of monitoring the remaining capacities of the batteries 22R and 22L; a signal processing step of processing the input sound signal; a sound emitting step of acoustically outputting the processed sound signal; a communication step of being connected to the smartphone P1 (the example of the communication terminal) owned by the user to allow the signal transmission and reception, and transmitting the processed sound signal to the smartphone P1 of the user U; and a control step of stopping an operation in the signal processing step based on the detection of the timing to transition to the first power-saving mode. In the control step, based on the detection of the timing to transition to the second power-saving mode, the user U is notified of being prompted to charge one of the batteries 22R and 22L of the earphone casings 2R and 2L, which has a smaller remaining capacity for a predetermined time, and only the other of the batteries 22R and 22L of the earphone casings 2R and 2L, which has a larger remaining capacity is continued to be used.

Therefore, a multi-stage power-saving mode including the first power-saving mode and the second power-saving mode is provided. In the first power-saving mode, the operations of the signal processing units such as the feedforward filter units 49R and 49L, the feedback filter units 53R and 53L, the beam forming units 63R and 63L, the noise suppression units 64R and 64L, and the ambient filter and volume adjustment units 48R and 48L can be stopped to suppress the power consumption required for arithmetic processing in the circuit boards 20R and 20L as much as possible. Then, in the second power-saving mode, after the first power-saving mode, the remaining amounts of the powers of the batteries 22R and 22L can be extended as a whole of the earphone apparatus 1 as much as possible by charging the batteries 22R and 22L of the right earphone casing 2R and the left earphone casing 2L in order from the one with a smaller remaining amount of the power. Accordingly, convenience to the user U can be improved by performing adaptive and efficient power-saving control according to the situation of the user U in an event such as a conference where utterance and reception scenes are expected.

The earphone apparatus 1 (the example of the acoustic apparatus) of the first embodiment further includes the external microphone 7R and the utterance microphone 8R (the examples of the first sensor) that detect the level of the ambient sound. The main circuits 30R and 30L (the examples of the detection units) detect the timing to transition to the first power-saving mode based on the detection that the level of the ambient sound is equal to or lower than the predetermined level threshold (the example of the first predetermined value). Therefore, the first power-saving mode is transitioned into under a usage condition where no problem exists even if the level of the ambient sound is not detected, and thus, even if a part of the signal processing function of the earphone apparatus 1 is stopped in the power-saving mode, the convenience to the user U is not impaired, and the adaptive and efficient power-saving control can be realized.

According to the earphone apparatus 1 (the example of the acoustic apparatus) of the first embodiment, the main circuits 30R and 30L (the examples of the detection units) detect the timing to transition to the first power-saving mode based on the instruction from the smartphone P1 (the example of the communication terminal) of the user U. Therefore, for example, the earphone apparatus 1 is set to the power-saving mode in response to an explicit instruction of the user U in a setting program of the smartphone P1 of the user U, and thus, the adaptive and efficient power-saving control can be realized according to the intention of the user U.

According to the earphone apparatus 1 (the example of the acoustic apparatus) of the first embodiment, the wireless communication units 34R and 34L (the examples of the communication units) include the transmission circuits 35R and 35L that transmit the processed sound signal to the smartphone P1 (the example of the communication terminal) of the user U, and reception circuits 36R and 36L that receive a sound signal transmitted from the smartphone P1 of the user U. When the main circuits 30R and 30L (the examples of the control units) detect the timing to transition to the first power-saving mode based on the instruction from the smartphone P1 of the user U, the operation of the transmission circuit 35R is stopped. Therefore, for example, the earphone apparatus 1 is set to the power-saving mode according to the mute setting of the online conversation application installed in the smartphone P1 of the user U, and thus, the adaptive and efficient power-saving control can be realized in such a manner that the convenience to the user U is not substantially impaired and inconvenience in the power-saving mode is not felt.

According to the earphone apparatus 1 (the example of the acoustic apparatus) of the first embodiment, the main circuits 30R and 30L (the examples of the control units) reduce the reception bit rate of the sound signal from the smartphone P1 (the example of the communication terminal) of the user U by a predetermined amount during the first power-saving mode. Therefore, the information processing amounts per unit time of the circuit boards 20R and 20L are reduced, and as a result, the power consumption of the earphone casing can be suppressed.

The earphone apparatus 1 (the example of the acoustic apparatus) of the first embodiment further includes the bone conduction sensors 9R and 9L (examples of the second sensor) that detect the utterance of the user U. The main circuits 30R and 30L (the examples of the detection units) detect the timing to transition to the first power-saving mode based on the detection of the utterance of the user U. Therefore, the power-saving mode is set when the earphone apparatus 1 is not used in the utterance of the user U, and thus, the adaptive and efficient power-saving control can be realized in such a manner that the convenience to the user U is not substantially impaired and the inconvenience in the power-saving mode is not felt.

According to the earphone apparatus 1 (the example of the acoustic apparatus) of the first embodiment, the main circuits 30R and 30L (the examples of the control units) lower the volume of the sound signal acoustically output from the other of the earphone casings 2R and 2L (the examples of the acoustic devices) by a predetermined volume level (an example of a second predetermined value) during the second power-saving mode. Efficient power-saving control can be realized by suppressing the power consumption of the outputs of the drivers 10R and 10L.

According to the earphone apparatus 1 (the example of the acoustic apparatus) of the first embodiment, the main circuits 30R and 30L (the example of the control unit) cause the smartphone P1 (the example of the communication terminal) of the user U to output the message of prompting the user U to charge one of the earphone casings 2R and 2L (the examples of the acoustic devices) for a predetermined time during the second power-saving mode. Therefore, the user U is more explicitly prompted to charge one of the batteries 22R and 22L of the earphone casings 2R and 2L, which has a smaller remaining amount, and the efficient power-saving control can be realized.

According to the earphone apparatus 1 (the example of the acoustic apparatus) of the first embodiment, when detecting that the charging of one of the earphone casings 2R and 2L (the examples of the acoustic devices) for a predetermined time is completed based on the outputs of the power monitoring units 21R and 21L (the examples of the monitoring units), the main circuits 30R and 30L (the examples of the control units) notify of prompting the user U to charge the other of the earphone casings 2R and 2L for a predetermined time, and make only one of the earphone casings 2R and 2L, which has been charged for a predetermined time, continue to be used. Therefore, the user U is allowed to continue to use only one of the right earphone casing 2R and the left earphone casing 2L and charge the other, and thus, the efficient power-saving control can be realized while using the earphone apparatus 1 within a minimum necessary range without significantly impairing the convenience to the user U. As a result, a total remaining amount of the powers of the batteries 22R and 22L of the entire earphone apparatus 1 can be extended to realize a use in a complete state as soon as possible.

Regarding Use Case of First Embodiment

Figure 7:
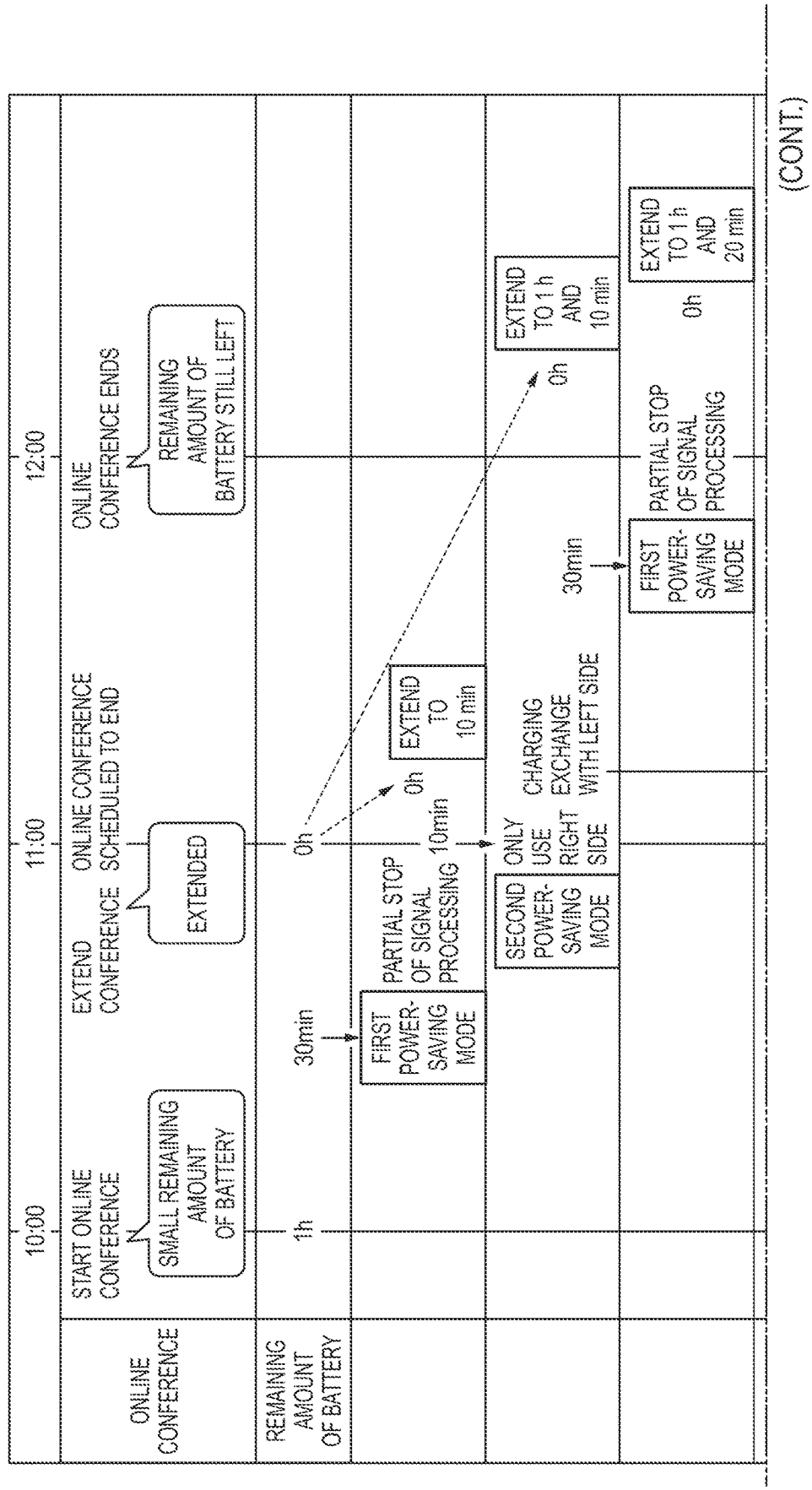
FIG. 7 is a time chart illustrating a use case example of an earphone according to the first embodiment.

An example of a use case of the first embodiment described above will be described with reference to FIG. 7. FIG. 7 is a time chart illustrating a use case example of the earphone apparatus 1 according to the first embodiment. In the present use case, the online conversation application is installed in the smartphone P1 of the user U, and it is assumed that an online conference is held by using this online conversation application.

As illustrated in FIG. 7, the online conference is scheduled, for example, to start at 10 am and end at 11 am. At the time of starting the online conference at 10 am, the powers of the batteries 22R and 22L of the right earphone casing 2R and the left earphone casing 2L are low and run out in the remaining 1 hour. With this remaining amount, the right earphone casing 2R and the left earphone casing 2L are paired right and left and used by the user U in a normal operation for a while.

The main circuits 30R and 30L detect the timing to transition to the first power-saving mode when the remaining amounts of the batteries 22R and 22L have 30 [min (minutes)] left based on the transmission from the power monitoring units 21R and 21L. Based on the detection, as described above, the main circuits 30R and 30L stop some of the functions related to the sound signal processing in the main circuits 30R and 30L themselves, the ANC circuits 40R and 40L, and the detection circuits 60R and 60L. Accordingly the earphone apparatus 1 is set into a state of the first power-saving mode in the paired use of the right earphone casing 2R and the left earphone casing 2L, and for example, the remaining amounts of the powers of both the right earphone casing 2R and the left earphone casing 2L are extended to 10 [min (minutes)].

Here, if the online conference cannot end at 11 am and the online conference is decided to be extended before 11 am, the main circuits 30R and 30L detect the timing to transition to the second power-saving mode when the remaining amounts of the powers become 10 [min (minutes)] or lower through the power monitoring units 21R and 21L. Based on the detection, as described above, information is exchanged through the wireless communication units 34R and 34L on the right and left, respectively, and the batteries 22R and 22L of the right earphone casing 2R and the left earphone casing 2L are compared to determine whose remaining amount is smaller.

Based on the comparison result, in the present use case, if the main circuits 30R and 30L determine that the remaining amount of the power of the left earphone casing 2L is smaller, the main circuits 30R and 30L notify of prompting the user U to charge the left earphone casing 2L for a predetermined time. Accordingly the left earphone casing 2L is removed from the ear, and then set on the earphone charging base 12 to be charged by the user U. Accordingly, only the right earphone casing 2R is continued to be used, and the earphone apparatus 1 is set into a state of the second power-saving mode in one use. By the charging, for example, the remaining amount of the power of the left earphone casing 2L is extended to 1 [h (hour)] and 10 [min (minutes)].

Then, when the charging of the battery 22L of the left earphone casing 2L for a predetermined time is completed, the charging exchange is performed on the right earphone casing 2R and the left earphone casing 2L. If the battery 22R of the right earphone casing 2R is charged by the charging exchange and this charging is completed in the same way, the right earphone casing 2R and the left earphone casing 2L are worn in both ears by the user U, and can be wirelessly connected to the smartphone P1 of the user U. Accordingly, the user U can use the earphones in the normal state (stereo) (a normal use of a pair of right and left).

Further, in a state where both the right earphone casing 2R and the left earphone casing 2L are used, when the remaining amount of the power of the battery 22L of the left earphone casing 2L becomes 30 [min (minutes)], the timing to transition to the first power-saving mode is detected for the left earphone casing 2L. Based on the detection, the main circuit 30L of the left earphone casing 2L stops some of the functions related to the sound signal processing in the main circuit 30L itself, the ANC circuit 40L, and the detection circuit 60L in the left earphone casing 2L. As a result, for example, the remaining amount of the power is extended to 1 [h (hour)] and 20 [min (minutes)].

Next, when the remaining amount of the power of the battery 22R of the right earphone casing 2R becomes 30 [min (minutes)], the timing to transition to the first power-saving mode is detected for the right earphone casing 2R in this case. Based on the detection, the main circuit 30R of the right earphone casing 2R stops some of the functions related to the sound signal processing in the main circuit 30R itself, the ANC circuit 40R, and the detection circuit 60R in the right earphone casing 2R. As a result, for example, the remaining amount of the power is extended to 1 [h (hour)] and 30 [min (minutes)].

In this way, as in the present use case, even if the batteries 22R and 22L of the right earphone casing 2R and the left earphone casing 2L have small remaining amounts of the powers at the start of the conference, and the conference is longer than planned, the adaptive and efficient power-saving control for the earphone apparatus 1 can be realized. Accordingly, the convenience to the user U can be improved.

Although the plurality of embodiments have been described above with reference to the drawings, it is needless to say that the present disclosure is not limited to such examples. It will be apparent to those skilled in the art that various alterations, modifications, substitutions, additions, deletions, and equivalents can be conceived within the scope of the claims, and it should be understood that they also belong to the technical scope of the present disclosure. Further, components in the above-described embodiments may be optionally combined within a range not departing from the spirit of the invention.

The present application is based on Japanese Patent Application No. 2021-073639 filed on Apr. 23, 2021, the contents of which are incorporated in the present application by reference.

INDUSTRIAL APPLICABILITY

The present disclosure is useful as an acoustic control method and an acoustic apparatus that improves convenience to a user by performing adaptive and efficient power-saving control according to a user condition in an event such as a conference where utterance and calling reception scenes are expected.

REFERENCE SIGNS LIST

1: earphone apparatus
2R, 2L: earphone casing
3R: housing
4R: rear chamber
5R: earpiece
6R, 6L: internal microphone
7R, 7L: external microphone
8R, 8L: utterance microphone
9R, 9L: bone conduction sensor
10R, 10L: driver
11R: front chamber
12: earphone charging base
20R, 20L: circuit board
21R, 21L: power monitoring unit
22R, 22L: battery
23R, 23L: ROM circuit
24R, 24L: RAM circuit
30R, 30L: main circuit
31R, 31L: bandpass filter and volume adjustment unit
32R, 32L: music playback and telephone mode switching unit
33R, 33L: volume adjustment unit
34R, 34L: wireless communication unit
35R, 35L: transmission circuit
36R, 36L: reception circuit
40R, 40L: ANC circuit
41R, 41L: first amplifier unit
42R, 42L: second amplifier unit
43R, 43L: third amplifier unit
44R, 44L: fourth amplifier unit
45R, 45L: first analog-to-digital conversion unit
46R, 46L: second analog-to-digital conversion unit
47R, 47L: side tone filter unit
48R, 48L: ambient filter and volume adjustment unit
49R, 49L: feedforward filter unit
50R, 50L: first digital addition unit
51R, 51L: second digital addition unit
52R, 52L: digital-to-analog conversion unit
53R, 53L: feedback filter unit
54R, 54L: analog addition unit
60R, 60L: detection circuit
61R, 61L: utterance detection unit
62R, 62L: wind noise detection unit
63R, 63L: beam forming unit
64R, 64L: noise suppression unit
100: mobile phone network
P1: smartphone
D1: display unit

The invention claimed is:

1. An acoustic apparatus comprising:
two first and second acoustic devices respectively worn in a left ear and a right ear of a user, wherein
each of the two acoustic devices includes:
a detection unit configured to detect a timing to transition to each of a first power-saving mode and a second power-saving mode;
a battery;
a monitoring unit configured to monitor a remaining capacity of the battery;
a signal processing unit configured to process an input sound signal;
a sound-emitting unit configured to acoustically output the processed sound signal;
a communication unit configured to transmit the processed sound signal to the communication terminal, and be connected to a communication terminal owned by the user to allow signal transmission and reception; and
a control unit configured to stop an operation of the signal processing unit based on the detection of the timing to transition to the first power-saving mode, and
the control unit is configured to
notify of prompting the user to charge a first acoustic device, which has a smaller remaining capacity of the battery, for a predetermined time and make only a second acoustic device, which has a larger remaining capacity of the battery, continued to be used based on the detection of the timing to transition to the second power-saving mode.

2. The acoustic apparatus according to claim 1, further comprising:
a first sensor configured to detect a level of an ambient sound, wherein
the detection unit detects the timing to transition to the first power-saving mode based on a detection that the level of the ambient sound is equal to or lower than a first predetermined value.

3. The acoustic apparatus according to claim 1, wherein
the detection unit detects the timing to transition to the first power-saving mode based on an instruction from the communication terminal.

4. The acoustic apparatus according to claim 3, wherein
the communication unit includes a transmission circuit configured to transmit the processed sound signal to the communication terminal, and a reception circuit configured to receive the sound signal transmitted from the communication terminal, and
the control unit stops an operation of the transmission circuit when detecting the timing to transition to the first power-saving mode based on an instruction from the communication terminal.

5. The acoustic apparatus according to claim 4, wherein
the control unit reduces a reception bit rate of the sound signal from the communication terminal by a predetermined amount during the first power-saving mode.

6. The acoustic apparatus according to claim 1, further comprising:
a second sensor configured to detect an utterance of the user, wherein
the detection unit detects the timing to transition to the first power-saving mode based on the detection of the utterance of the user.

7. The acoustic apparatus according to claim 1, wherein the control unit lowers a volume of a sound signal acoustically output from the second acoustic device by a second predetermined value during the second power-saving mode.

8. The acoustic apparatus according to claim 1, wherein the control unit causes the communication terminal to output a message of prompting the user to charge the first acoustic device for a predetermined time during the second power-saving mode.

9. The acoustic apparatus according to claim 1, wherein when detecting that the charging of the first acoustic device for a predetermined time is completed based on an output of the monitoring unit, the control unit notifies of prompting the user to charge the second acoustic device for a predetermined time, and makes only the first acoustic device which has been charged for a predetermined time continued to be used.

10. An acoustic control method for controlling two acoustic devices each including a battery and respectively worn in a left ear and a right ear of a user, the acoustic control method comprising:

for each of the two acoustic devices:

a detection step of detecting a timing to transition to each of a first power-saving mode and a second power-saving mode;

a monitoring step of monitoring a remaining capacity of the battery;

a signal processing step of processing an input sound signal;

a sound-emitting step of acoustically outputting the processed sound signal;

a communication step of being connected to a communication terminal owned by the user to allow signal transmission and reception, and transmitting the processed sound signal to the communication terminal; and a control step of stopping an operation in the signal processing step based on the detection of the timing to transition to the first power-saving mode, wherein in the control step, the user is notified of being prompted to charge a first acoustic device, which has a smaller remaining capacity of the battery, for a predetermined time based on the detection of the timing to transition to the second power-saving mode, and only a second acoustic device, which has a larger remaining capacity of the battery, is continued to be used.

* * * * *